United States Patent
Min et al.

(10) Patent No.: US 10,237,907 B2
(45) Date of Patent: Mar. 19, 2019

(54) APPARATUS AND METHOD FOR SUPPORTING MOBILITY IN A HETEROGENEOUS WIRELESS COMMUNICATION SYSTEM

(75) Inventors: Chan-Ho Min, Seoul (KR); Soeng-Hun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 442 days.

(21) Appl. No.: 13/117,412

(22) Filed: May 27, 2011

(65) Prior Publication Data

US 2011/0294508 A1    Dec. 1, 2011

(30) Foreign Application Priority Data

May 28, 2010    (KR) .................. 10-2010-0050277

(51) Int. Cl.
*H04W 76/19*    (2018.01)
*H04W 36/00*    (2009.01)
(Continued)

(52) U.S. Cl.
CPC ....... *H04W 76/19* (2018.02); *H04W 36/0085* (2018.08); *H04W 36/0033* (2013.01);
(Continued)

(58) Field of Classification Search
CPC .............. H04W 76/028; H04W 36/08; H04W 36/0033; H04W 36/0055; H04W 36/0083; H04W 76/027; H04W 36/24; H04W 36/06
(Continued)

(56) References Cited

U.S. PATENT DOCUMENTS 6,697,627 B1 *    2/2004    Ueno ................ H04W 36/0061
                                                                  370/329
7,050,793 B1 *    5/2006    Kenward et al. .......... 455/414.4
(Continued)

FOREIGN PATENT DOCUMENTS

CN    101466125 A    6/2009
JP    2009-118379    5/2009
(Continued)

OTHER PUBLICATIONS

International Search Report dated Dec. 26, 2011 in connection with International Patent Application No. PCT/KR2011/003927.
(Continued)

*Primary Examiner* — Jaime M Holliday

(57) ABSTRACT

An apparatus and method in a heterogeneous wireless communication system reconnect a Mobile Station (MS) to a previously connected cell upon occurrence of a Radio Link Failure (RLF) in a current cell when a portion of a coverage of the second cell is included in a coverage of the first cell. A Mobile Station (MS) stores system information of a first Base Station (BS) of a first cell when performing handover from the first cell to a second cell. When changed system information of the first BS is received from a second BS of the second cell, the MS updates the stored system information using the changed system information. When detecting that a connection with the second cell is lost prior to a handover from the second cell, the MS performs reconnection to the first BS using the stored system information.

24 Claims, 18 Drawing Sheets

(51) Int. Cl.
*H04W 36/08* (2009.01)
*H04W 36/06* (2009.01)
*H04W 36/24* (2009.01)

(52) U.S. Cl.
CPC .... *H04W 36/0055* (2013.01); *H04W 36/0083* (2013.01); *H04W 36/06* (2013.01); *H04W 36/08* (2013.01); *H04W 36/24* (2013.01)

(58) Field of Classification Search
USPC .................................................. 455/436–444
See application file for complete search history.

(56) References Cited

U.S. PATENT DOCUMENTS

| | | | |
|---|---|---|---|
| 8,699,450 B2 | 4/2014 | Chin et al. | |
| 2002/0025811 A1* | 2/2002 | Willey | H04W 52/0216 455/434 |
| 2003/0119508 A1* | 6/2003 | Gwon et al. | 455/436 |
| 2004/0266435 A1* | 12/2004 | de Jong et al. | 455/436 |
| 2007/0155376 A1* | 7/2007 | Payyappilly | H04W 76/041 455/422.1 |
| 2009/0061878 A1* | 3/2009 | Fischer | 455/436 |
| 2009/0122763 A1* | 5/2009 | Oguchi | 370/331 |
| 2009/0124260 A1* | 5/2009 | Casati | H04W 76/22 455/436 |
| 2009/0279504 A1 | 11/2009 | Chin et al. | |
| 2010/0048217 A1 | 2/2010 | Deshpande et al. | |
| 2010/0113027 A1* | 5/2010 | Hsu | H04W 36/0005 455/436 |
| 2010/0113032 A1 | 5/2010 | Lee et al. | |
| 2010/0113036 A1 | 5/2010 | Cho et al. | |
| 2010/0197311 A1* | 8/2010 | Walldeen | H04W 36/0055 455/444 |
| 2010/0330959 A1* | 12/2010 | Mildh | H04W 8/22 455/410 |
| 2011/0007719 A1* | 1/2011 | Lee | H04J 3/0682 370/336 |
| 2011/0080825 A1* | 4/2011 | Dimou et al. | 370/216 |
| 2011/0086640 A1* | 4/2011 | Iwamura et al. | 455/436 |
| 2012/0064886 A1* | 3/2012 | Kim et al. | 455/423 |
| 2012/0282932 A1* | 11/2012 | Yu | H04W 84/005 455/437 |
| 2014/0287764 A1 | 9/2014 | Jeong et al. | |

FOREIGN PATENT DOCUMENTS

| | | |
|---|---|---|
| JP | 2009-278474 | 11/2009 |
| JP | 2010011244 A | 1/2010 |
| KR | 10-2010-0037262 | 4/2010 |
| WO | WO 2009/020362 A2 | 2/2009 |

OTHER PUBLICATIONS

Written Opinion of International Searching Authority dated Dec. 26, 2011 in connection with International Patent Application No. PCT/KR2011/003927.
Infineon Technologies, "Unreliable HeNB", 3GPP TSG RAN WG2 #68, Jeju-Do, Korea, Nov. 9-13, 2009, 7 pages.
Catt, "RLF report definition based on MRO stage-2 solution", 3GPP TSG-RAN WG3 Meeing #65bis, Miyazaki, Japan, Oct. 12-15, 2009, 7 pages.
Notice of Preliminary Rejection dated Oct. 15, 2013 in connection with Japanese Application No. 2013-510035, 7 pages.
Notice of Patent Grant dated Aug. 26, 2014 in connection with Japenese Patent Application No. 2013-510035; 5 pages.
Text of the First Office Action dated Feb. 2, 2015 in connection with Chinese Patent Application No. 201180035667X; 13 pages.
Translated Chinese Office Action dated Oct. 16, 2015 in connection with Chinese Patent Application No. 201180035667X; 17 pages.
3GPP TSG-RAN2 Meeting #61; "NAS States, Persistent Scheduling, C-RNTI Allocation at Handover . . . "; Nokia Siemens Networks; R2-081372; Feb. 15, 2008; Sorrento, Italy; 17 pgs.
Third Office Action dated Apr. 8, 2015in connection with Chinese Patent Application No. 201180035667X; 8 pages.
"3rd Generation Partnership Project; Technical Specification Group Radio Access Network: E-UTRAN Mobility Evaluation and Enhancement; (Release 9)," 3GPP Draft, R1-090856, XP050597250, TP for TR for Mobility Studies, 3rd Generation Partnership Project (3GPP), Feb. 3, 2009, 15 pages.
"TP on Correction to RB Suspension," 3GPP TSG-RAN WG2 #62bis, LG Electronics, R2-083292, Warsaw, Poland, Jun. 30-Jul. 4, 2008, 3 pages.
"Possible Solutions to Improve Mobility Performance," 3GPP TSG-RAN WG1 #56, Qualcomm Europe, R1-090857, Athens, Greece, Feb. 9-13, 2009, 4 pages.
"Further Evaluations of Mobility Performance in LTE," 3GPP TSG-RAN WG1 #56bis, Qualcomm Europe, R1-091446, Seoul, Korea, Mar. 23-27, 2009, 6 pages.
"Early Handover Detection," 3GPP TSG-RAN WG3#65, Motorola, R3-091786, Aug. 24-28, 2009, 3 pages.
Foreign Communication From a Related Counterpart Application, European Application No. 11786948.7-1854, Extended European Search Report dated Dec. 14, 2016, 11 pages.
Office Action, "Notice of Preliminary Rejection," Korean Application No. KR10-2010-0050277, dated Aug. 22, 2016, 8 pages.
Fourth Office Action in connection with Chinese Patent Application No. 201180035667X, dated Sep. 26, 2016, 8 pages.

* cited by examiner

APPARATUS AND METHOD FOR SUPPORTING MOBILITY IN A HETEROGENEOUS WIRELESS COMMUNICATION SYSTEM

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on May 28, 2010 and assigned Serial No. 10-2010-0050277, the entire disclosure of which is hereby incorporated by reference.

TECHNICAL FIELD OF THE INVENTION

The present invention relates to a wireless communication system. More particularly, the present invention relates to an apparatus and method for supporting mobility in a heterogeneous wireless communication system.

BACKGROUND OF THE INVENTION

In wireless communication systems, the recent trend is that a demand for high-speed data services continuously increases from the traffic perspective, and data services are provided mainly in a specific small area from the coverage perspective. Accordingly, developers and service providers of wireless communication systems have concerns regarding the small-size cells such as a pico cell and a hot zone.

Generally, a pico cell has the following characteristics. The pico cell has a smaller coverage than a macro cell and may overlap with the macro cell. Also, the pico cell operates in the same or a different frequency from the macro cell, and uses a low transmit power compared to a macro BS. In some situations, the pico cell can be accessed only by some licensed users or can be accessed by all users.

In recent years, the standards group, i.e. the Third Generation Partnership Project Radio Access Network Working Group 1 (3GPP RAN WG1), is considering heterogeneous networks. A heterogeneous network refers to a cellular deployment of a form in which Base Stations (BSs) using a low transmit power are overlapped with each other within the coverage of a macro BS. That is, cells of different sizes are mixed or overlapped with each other. However, BSs managing the respective overlapped cells make use of the same wireless technology. A BS using less transmit output in the heterogeneous network can be a micro BS, a Remote Radio Head (RRH), a pico enhanced Node B (eNB), a home eNB, a femto BS, a relay node and the like. For example, the heterogeneous network can be constructed according to FIG. 1.

FIG. 1 illustrates a heterogeneous wireless communication system according to the conventional art. Referring to FIG. 1, a plurality of pico cells 110-1 and 110-2, a plurality of femto cells 120-1 to 120-3, and a plurality of relay nodes 130-1 and 130-2 are overlapped within a macro cell 100, and each cell provides service to Mobile Stations (MSs) located within its own coverage. At this time, the MSs located in the coverage of the plurality of pico cells 110-1 and 110-2, the plurality of femto cells 120-1 to 120-3, and the plurality of relay nodes 130-1 and 130-2 are also located in the coverage of the macro cell 100; however, the MSs have preferential access to a micro cell with an excellent channel state rather than the macro cell 100. That is, if the MS accessing the macro cell 100 enters the coverage of the micro cell, the MS performs handover to the micro cell from the macro cell 100.

When an MS moves into a macro cell, a situation of FIG. 2 may occur. FIG. 2 illustrates an example of a movement path of an MS in a heterogeneous wireless communication system according to the conventional art. In FIG. 2, an MS 230 moves while connecting with a macro BS 200 within a cell of the macro BS 200. According to the movement of the MS 230, the MS 230 passes a cell edge portion of a pico BS 210. So, the MS 230 that has access to the macro BS 200 during a time (t1) 251 is located within a cell of the pico BS 210 during a time (t2) 252, and performs handover to the pico BS 210. Then, the MS 230 leaves the cell of the pico BS 210.

When leaving the cell of the pico BS 210, the MS 230 should again perform handover to the macro BS 200 to maintain seamless service. At this time, if the MS 230 is moving quickly, the time (t2) 252 when the MS 230 stays in the cell of the pico BS 210 would be very short. As such, it fails to ensure enough time to perform a handover, so a Radio Link Failure (RLF) may take place before the handover to the macro BS 200 is completed, causing data loss, service interruption and such. Particularly, in a real-time service such as Voice over Internet Protocol (VoIP), service interruption felt by a user may be critical. Furthermore, during handover from the macro BS 200 to the pico BS 210, the macro BS 200 discards context information of the MS 230. As such, attempts by the MS 230 to reconnect to the macro BS 200 will take a long time.

As described above, in an environment where a macro cell and a micro cell are overlapped, a situation for re-handover to the macro cell can occur. But, as an MS moves quickly, it is impossible to ensure enough time to perform handover. Furthermore, it is also difficult to reconnect to a macro BS. Thus, there is a need to propose an alternative for minimizing service interruption by quickly reconnecting to the macro BS in the above situation.

SUMMARY OF THE INVENTION

To address the above-discussed deficiencies of the prior art, it is a primary aspect of the present invention to provide an apparatus and method for minimizing service interruption when moving from a pico cell to a macro cell in a wireless communication system.

Another aspect of the present invention is to provide an apparatus and method for reducing a time taken to do re-handover to a macro cell in a wireless communication system.

Another aspect of the present invention is to provide an apparatus and method for an MS suffering a Radio Link Failure (RLF) in a pico cell to establish connection to a macro cell in a wireless communication system.

The above aspects are achieved by providing an apparatus and method for supporting mobility in a heterogeneous wireless communication system.

According to one aspect of the present invention, an operation method of a Mobile Station (MS) in a wireless communication system is provided. The method includes storing system information of a first Base Station (BS) of a first cell when performing handover from the first cell to a second cell. The method also includes detecting that a connection with the second cell is lost prior to a handover from the second cell. Reconnection to the first BS is performed using the stored system information. During this operation of the method, a portion of a coverage of the second cell overlaps a coverage of the first cell.

According to another aspect of the present invention, an operation method of a Base Station (BS) of a first cell in a wireless communication system is provided. The method includes transmitting a request for a path switch for a Mobile Station (MS) to an upper node when the MS performs handover from a second cell to the first cell. When context information of the MS is changed, the changed context information is transmitted to a second BS of the second cell. A portion of a coverage of the first cell is included in a coverage of the second cell.

According to another aspect of the present invention, an operation method of a Base Station (BS) of a first cell in a wireless communication system is provided. The method includes, after a Mobile Station (MS) performs handover from the first cell to a second cell, receiving changed context information of the MS from a second BS of the second cell. Context information of the MS is updated using the changed context information. A coverage of a second cell is included in a coverage of the first cell.

According to another aspect of the present invention, an apparatus for a Mobile Station (MS) in a wireless communication system is provided. The apparatus includes a storage unit and a controller. The storage unit stores system information of a first Base Station (BS) of a first cell when the MS is performing handover from the first cell to a second cell. The controller detects that a connection with the second cell is lost prior to a handover from the second cell and performs reconnection to the first BS using the stored system information. A portion of a coverage of the second cell is included in a coverage of the first cell.

According to another aspect of the present invention, an apparatus of a Base Station (BS) of a first cell in a wireless communication system is provided. The apparatus includes a controller and a backhaul communication unit. The controller transmits a request for a path switch for a Mobile Station (MS) to an upper node when an MS performs handover from a second cell to the first cell. The backhaul communication unit transmits the changed context information to a second BS of the second cell when context information of the MS is changed. A portion of a coverage of the first cell is included in a coverage of the second cell.

According to yet another aspect of the present invention, an apparatus for a Base Station (BS) of a first cell in a wireless communication system is provided. The apparatus includes a backhaul communication unit and a controller. The backhaul communication unit receives changed context information of a Mobile Station (MS) from a second BS of a second cell after the MS performs handover from the first cell to the second cell. The controller updates context information of the MS using the changed context information. A portion of a coverage of the second cell is included in a coverage of the first cell.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 3 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Preferred embodiments of the present invention will be described with reference to the accompanying drawings. In the following description, well-known functions or constructions are not described in detail as they would obscure the invention unnecessarily.

Below, embodiments of the present invention provide a technology for a Mobile Station (MS) suffering a Radio Link Failure (RLF) in a pico cell to reconnect to a macro cell in a wireless communication system. For convenience, the embodiments of the present invention use terms and names defined in the Third Generation Partnership Project Long Term Evolution (3GPP LTE). However, the embodiments of the present invention are not limited by the terms and names, and are also analogously applicable to systems following other rules. Also, in the following description, a 'pico Base Station (BS)' may be interchanged with a 'Home enhanced Node B (HeNB)', and a 'macro BS' may be interchanged with an 'enhanced Node B (eNB)'.

Figure 1:
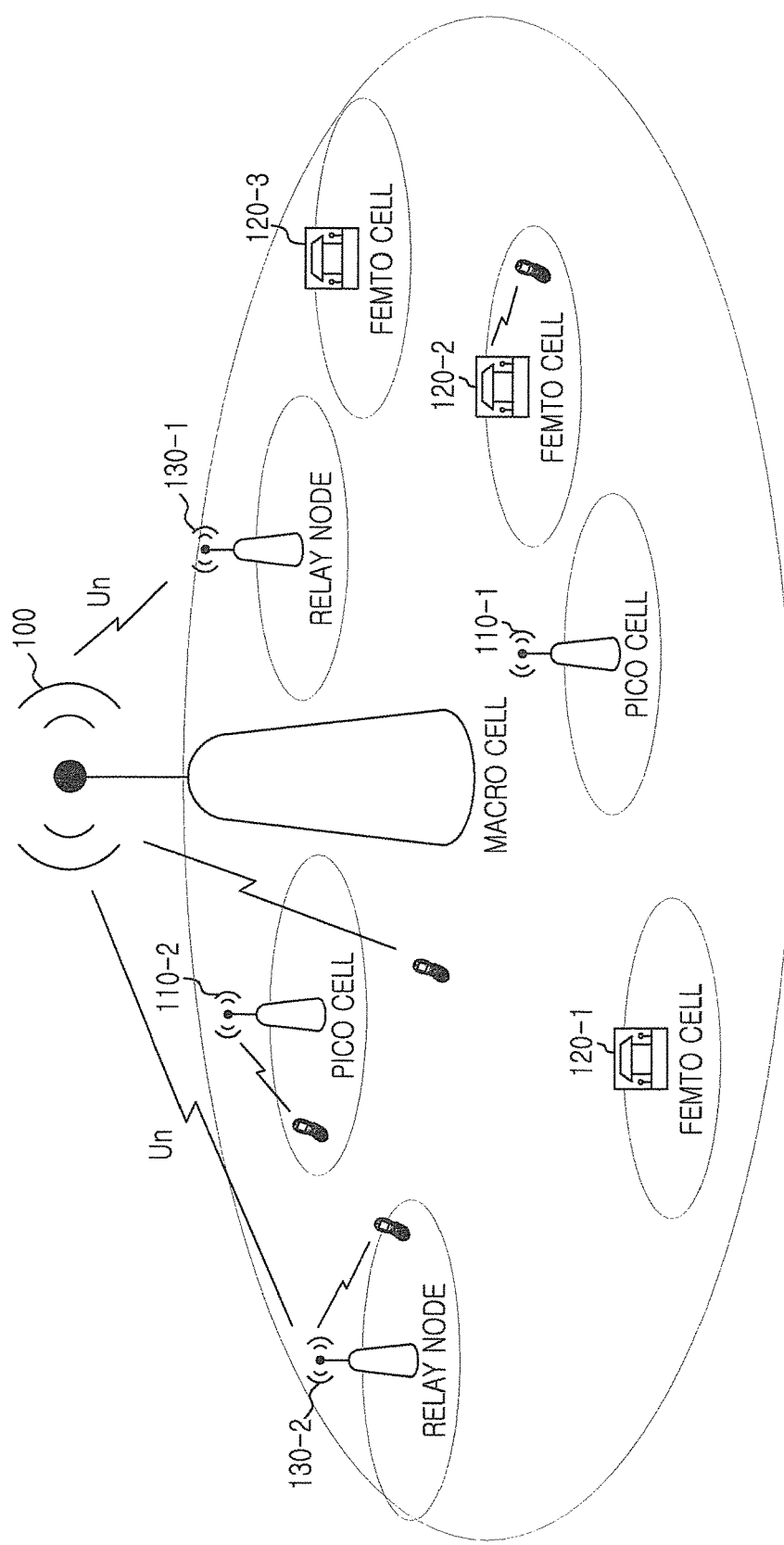
FIG. 1 is a diagram of a heterogeneous wireless communication system according to the conventional art.
Figure 2:
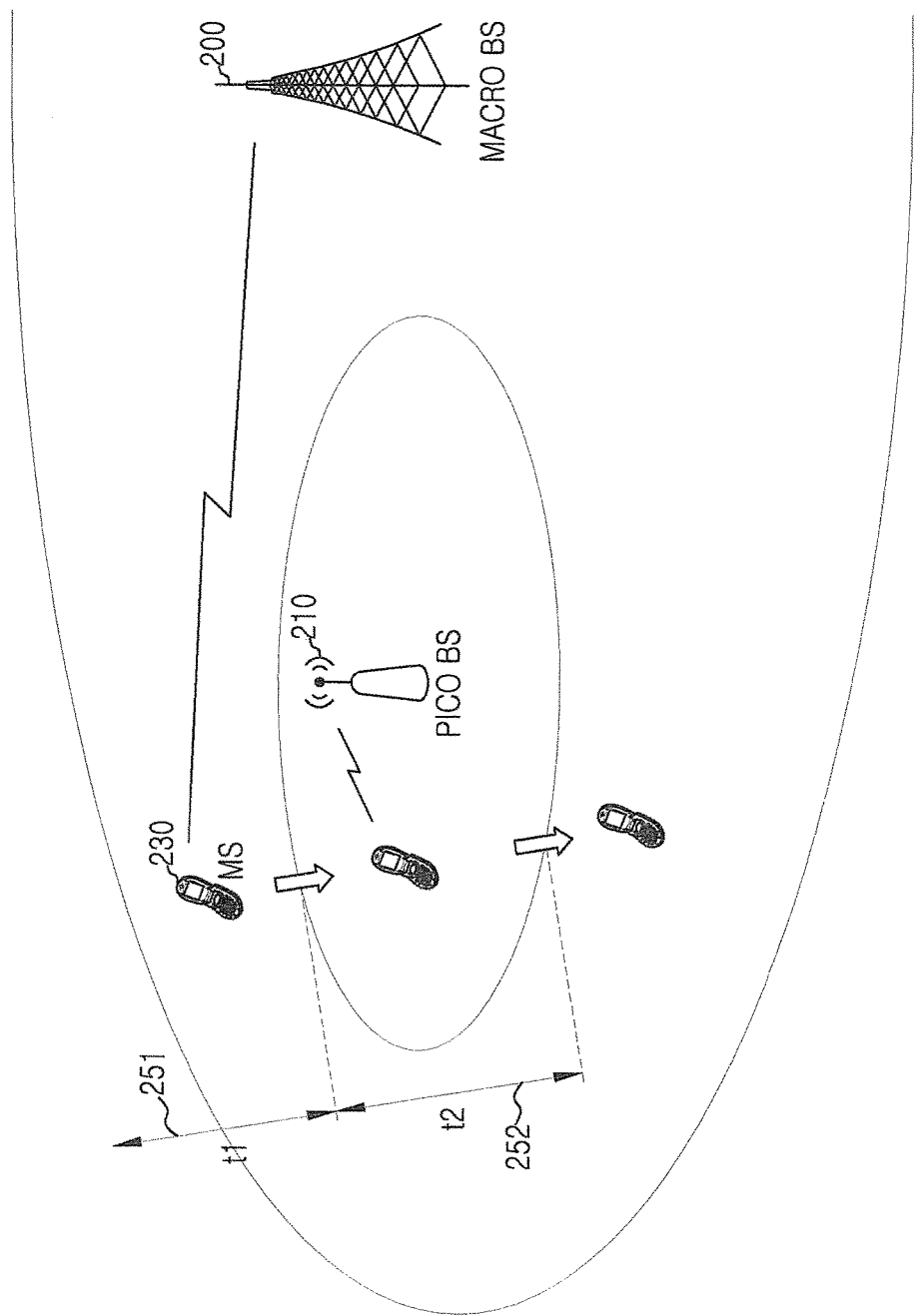
FIG. 2 is a diagram of an example of a movement path of a Mobile Station (MS) in a heterogeneous wireless communication system according to the conventional art.
Figure 3:
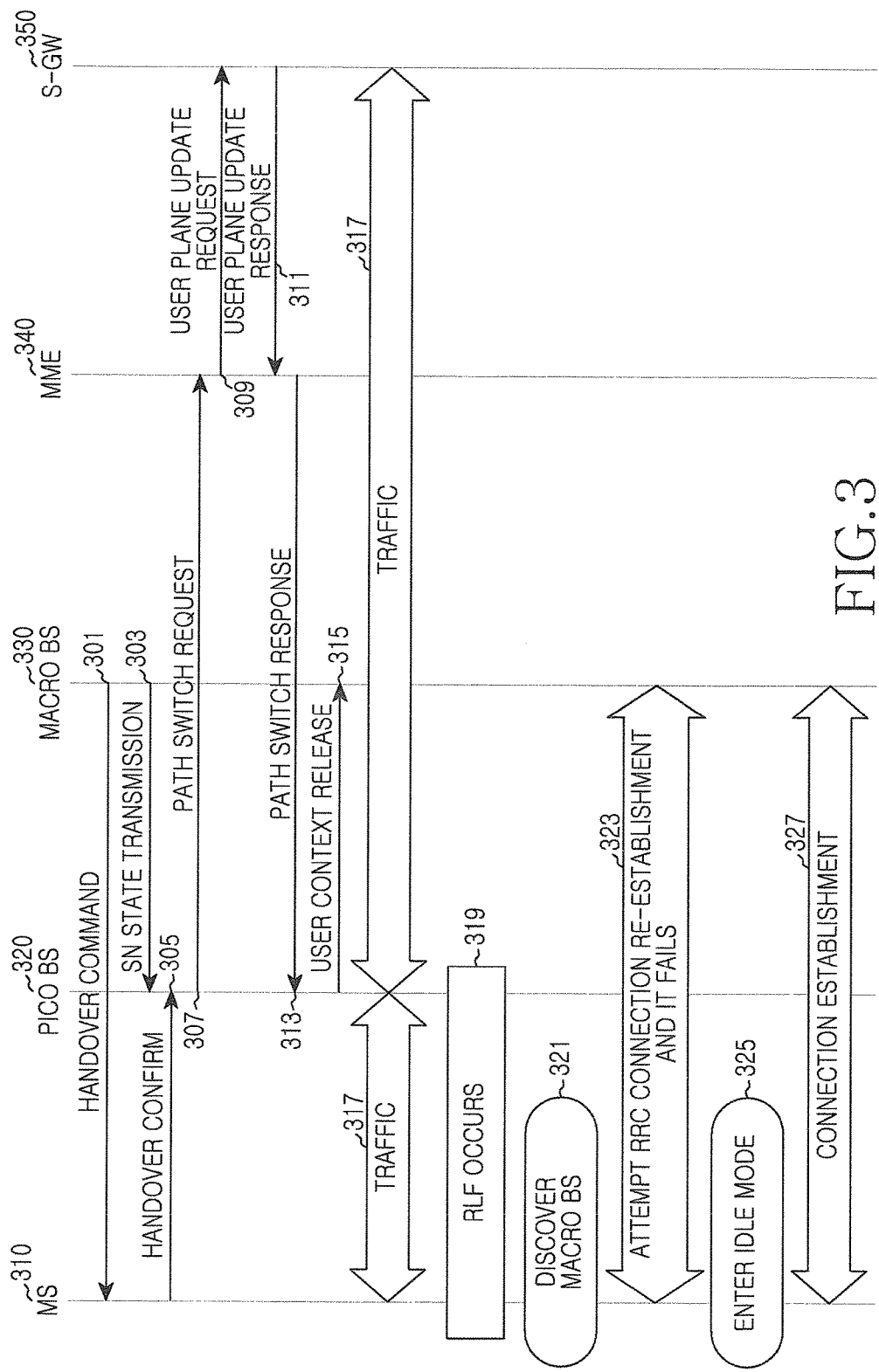
FIG. 3 is a ladder diagram of a signal exchange for an MS to reconnect from a pico cell to a macro cell in a heterogeneous wireless communication system according to an embodiment of the present invention.

In order to be helpful to the understanding of the present invention, a procedure of performing reconnection to a macro cell in a situation of FIG. 2 is described. FIG. 3 illustrates a signal exchange for an MS to reconnect from a pico cell to a macro cell in a heterogeneous wireless communication system according to an embodiment of the present invention.

Referring to FIG. 3, an MS 310 entering a cell of a pico BS 320 receives a handover command from a macro BS 330 (step 301). For example, the handover command is transmitted through a Radio Resource Control (RRC) connection reconfiguration message. Although not illustrated in FIG. 3, prior to transmitting the handover command, the macro BS 330 performs a procedure of determining whether to perform a handover based on signal measurement information reported from the MS 310 and identifying whether the handover is acceptable to the pico BS 320. At this time, the pico BS 320 performs admission control according to a request of the macro BS 330.

The macro BS 330 transmitting the handover command transmits Sequence Number (SN) state information of the MS 310 to the pico BS 320, i.e. a target BS of handover (step 303). The SN state information indicates a progress state of a sequence number for data in a Packet Data Convergence Protocol (PDCP) layer and is used for data encryption, integrity protection, and such.

The MS 310 receiving the handover command transmits a handover confirm to the pico BS 320 (step 305). For example, the handover confirm is transmitted through an RRC connection reconfiguration complete message. At this time, although not illustrated in FIG. 3, the MS 310 transmits to the macro BS 330 a Random Access (RA) preamble; to acquire synchronization with the macro BS 330 and, in response to this, the macro BS 330 transmits to the MS 310 a Timing Advance (TA) that represents a difference of synchronization between the MS 310 and the macro BS 330. At this time, the macro BS 330 transmits to the MS 310, together with the TA, information on uplink resources necessary for transmitting the handover confirm. In response, the MS 310 controls uplink synchronization using the TA and then, transmits the handover confirm through allocated uplink resources.

The pico BS 320 then transmits to a Mobility Management Entity (MME) 340 a path switch request message informing that a serving cell of the MS 310 changes (step 307). In response, the MME 340 transmits to a Serving Gateway (S-GW) 350 a user plane update request message (step 309), and the S-GW 350 receiving the user plane update request message re-establishes a downlink traffic path for the MS 310. The S-GW 350 transmits to the MME 340 a user plane update response message (step 311). Next, the MME 340 transmits a path switch response message to the pico BS 320 (step 313). The pico BS 320 identifying the path re-establishment transmits to the macro BS 330 a user context release request for the MS 310 (step 315).

The MS 310 then maintains the connection with the pico BS 320, and transmits/receives uplink/downlink traffic through the pica BS 320 and the S-GW 350 (step 317). At this time, the MS 310 detects an RLF (step 319), and discovers the macro BS 330 (step 321). In other words, the MS 310 detects that the connection with the pico BS 320 is not kept, and detects a signal of the macro BS 330. Accordingly, the MS 310 attempts RRC connection re-establishment to the macro BS 330. At this time, in order to attempt the RRC connection re-establishment, the MS 310 has to acquire system information of the macro BS 330. The system information is acquired by receiving at least one System Information Block (SIB) broadcasted by the macro BS 330. However, the RRC connection re-establishment fails (step 323). This is because the macro BS 330 has discarded context information of the MS 310 according to step 315. As such, the MS 310 enters an idle mode (step 325) and, during the idle mode, performs new RRC connection establishment with the macro BS 330 (step 327).

Embodiments of the present invention propose the following techniques:

1) technique for supporting an MS to perform a fast RRC connection re-establishment procedure to a macro cell; and 2) technique for re-establishing connection to a macro cell using a specific indicator.

Here, technique 1) is divided into a technique for a macro BS to keep context information of an MS through a user context update procedure, and a technique for an MS to keep system information of a macro BS during a connection to a pico BS through a system information update procedure. However, between the technique for using the user context update procedure and the technique for using the system information update procedure, one or both techniques are applicable.

With regard to technique 1), the technique for using the user context update procedure is described below.

When an MS suffers an RLF in a pico cell in an environment where the pico cell is overlapped within a macro cell, there is a great possibility that the MS discovers a macro cell that has previously been connected with the MS. Thus, the MS will seek to reconnect to the macro BS. At this time, through an RRC connection re-establishment procedure, the MS attempts to connect with the macro cell. However, because the RRC connection re-establishment procedure is a procedure that is executable with the macro BS that includes context information of a corresponding MS, the RRC connection re-establishment procedure fails with the macro BS that has already deleted the context information of the MS. Thus, embodiments of the present invention propose ways for the macro BS to keep the context information of the MS.

Figure 4A:
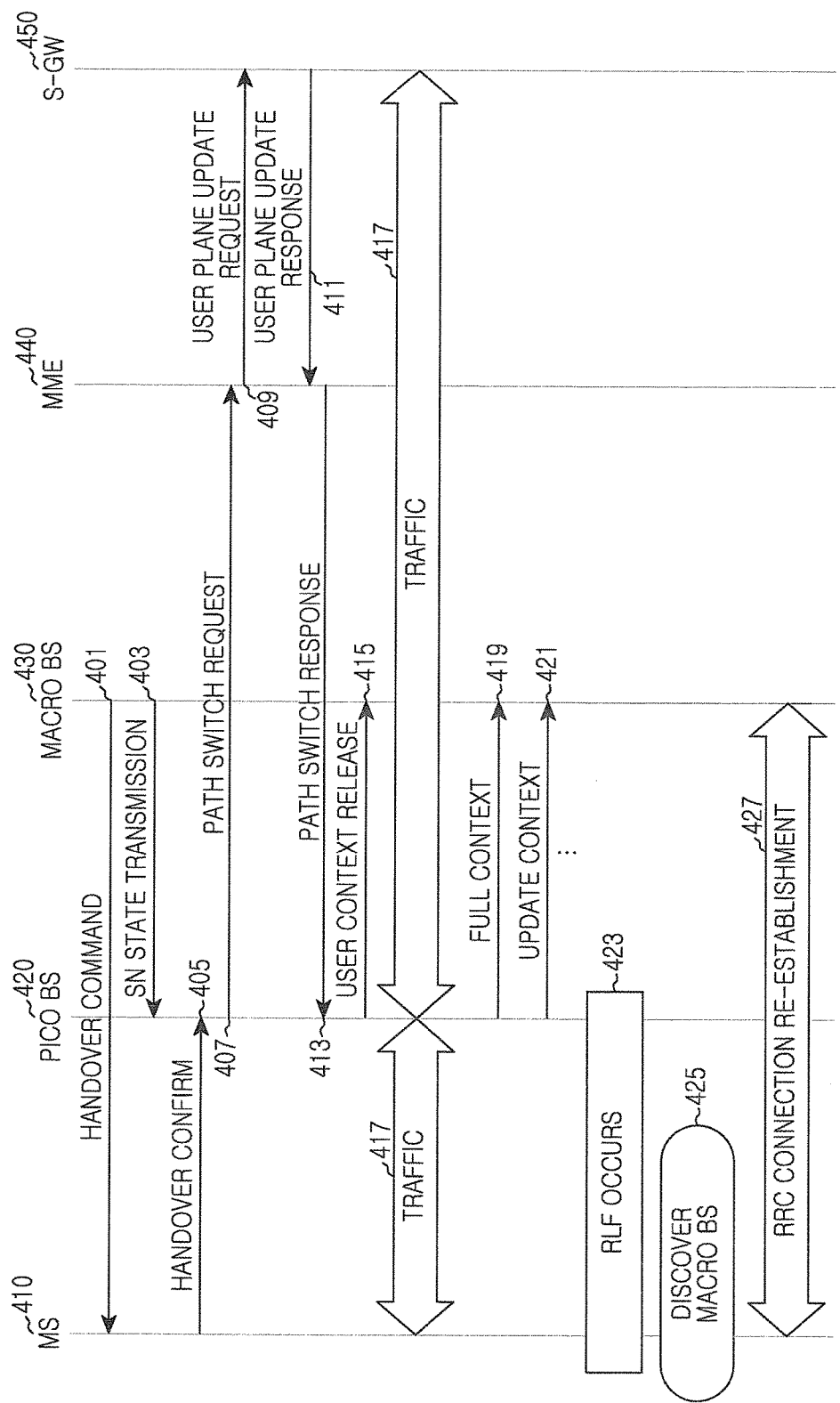
FIGS. 4A and 4B are ladder diagrams of a signal exchange for an MS to reconnect from a pico cell to a macro cell in a heterogeneous wireless communication system according to a first type of embodiments of the present invention.
Figure 4B:
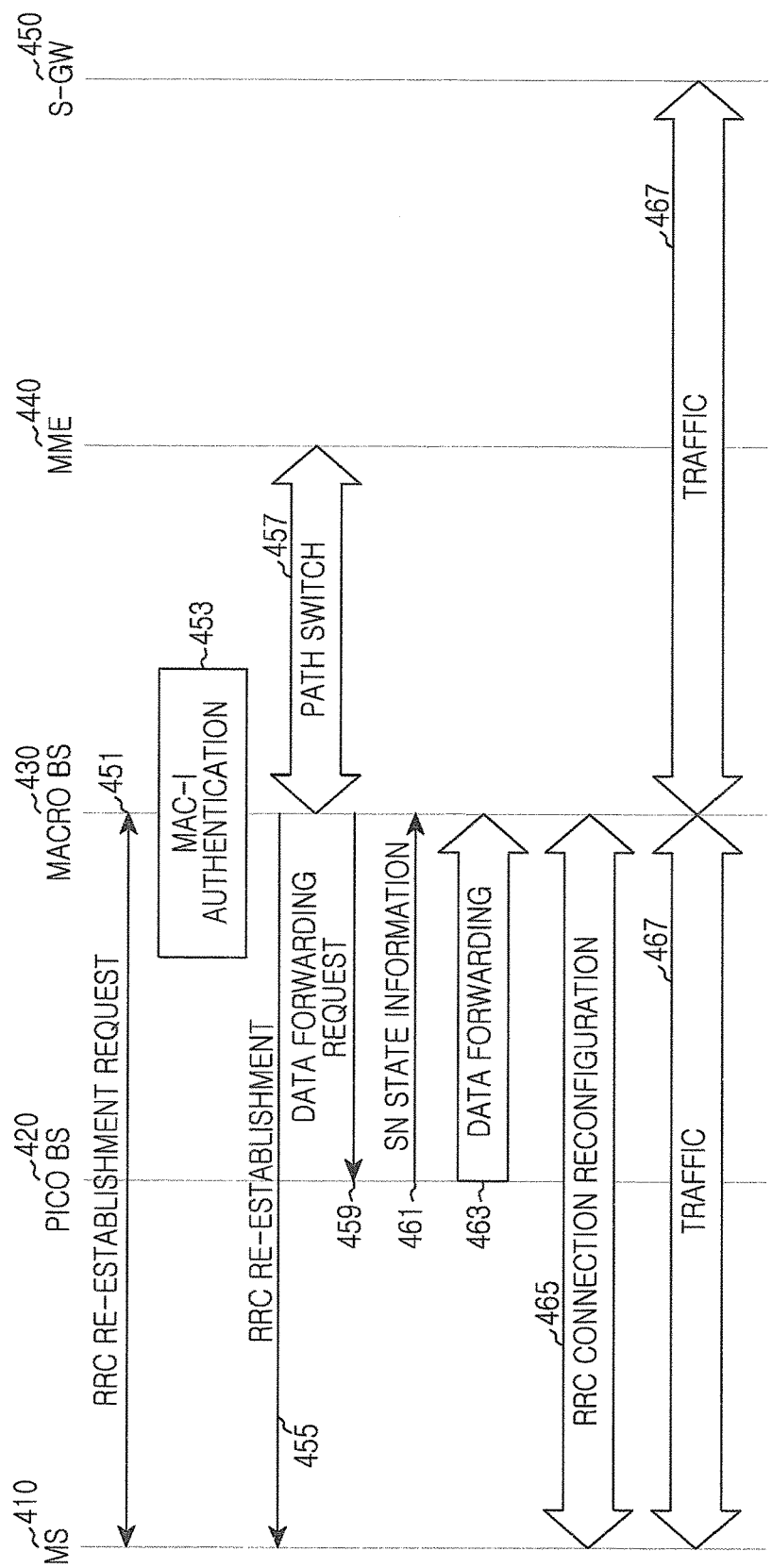

FIGS. 4A and 4B illustrate a signal exchange for an MS to reconnect from a pico cell to a macro cell in a heterogeneous wireless communication system according to a first type of embodiments of the present invention.

Referring to FIG. 4A, an MS 410 entering a cell of a pico BS 420 receives a handover command from a macro BS 430 (step 401), and the macro BS 430 transmits SN state information of the MS 410 to the pico BS 420 that is a target BS of handover (step 403). Also, the MS 410 receiving the handover command transmits a handover confirm to the pico BS 420 (step 405). The pico BS 420 then transmits to the MME 440 a path switch request message informing that a serving cell of the MS 410 changes (step 407). In response, the MME 440 transmits to the S-GW 450 a user plane update request message (step 409). In response, the S-GW 450 re-establishes a downlink traffic path for the MS 410 and transmits a user plane update response message to the MME 440 (step 411). Next, the MME 440 transmits a path switch response message to the pico BS 420 (step 413). The pico BS 420 identifying the accomplishment of path re-establishment transmits to the macro BS 430 a user context release request for the MS 410 (step 415). Next, the MS 410 maintains the connection with the pico BS 420, and transmits/receives uplink/downlink traffic through the pico BS 420 and the S-GW 450 (step 417).

After the handover is completed through steps 401 to 417, the pico BS 420 transmits the full context information of the MS 410 to the macro BS 430 (step 419). According to another embodiment of the present invention, step 415 of transmitting the user context release request may be omitted and, in this situation, step 419 of transmitting the full context information may also be omitted. Here, the context information is information associated with transmit resources that are in use for the MS 410, bearer setup and such, and is forwarded from a source BS to a target BS during a handover preparation procedure and such. For example, the context information includes measurement configuration that an MS uses in a source cell, information associated with radio resources that the MS uses in the source cell, such as Radio Bearer (RB) configuration information, Media Access Control (MAC) layer configuration information, physical layer related information and such, Cell-Radio Network Temporary Identifier (C-RNTI) that the MS uses in the source cell, security related information and such. Taking into consideration the situation of FIG. 2 according to an embodiment of the present invention, because the MS 410 that has access to the pico BS 420 leaves the pico cell before going through a normal handover procedure, the context information of the MS 410 cannot be forwarded to the macro BS 430. According to an embodiment of the present invention, the pico BS 420 previously forwards the context information of the MS 410 to the macro BS 430 before handover is triggered.

Afterwards, if the context information of the MS 410 changes or a signal intensity of the MS 410 decreases below a threshold, the pico BS 420 transmits context update information to the macro BS 430 (step 421). That is, if the context information of the MS 410 changes during the course of data transmission/reception, or the signal intensity of the MS 410 decreases below the threshold, the pico BS 420 forwards the context infoituation of the MS 410 to the macro BS 430 through a context update message. For example, changing of the context information means that measurement configuration used by the MS 410 in the pico BS 420 changes, new radio bearer connection is established, in-use radio bearer connection becomes extinct, or a C-RNTI changes and so forth. Accordingly, if the context information does not change, transmission of the context update information may not occur, and if a change of the context information takes place twice or more, the transmission of the context update information may also be carried out twice or more. Accordingly, the macro BS 430 can maintain the latest context information of the MS 410.

The MS 410 then detects an RLF (step 423). In other words, the MS 410 detects that the connection with the pico BS 420 is lost. Accordingly, the MS 410 preferentially searches for the macro BS 430, i.e. the latest accessed macro cell. That is, the MS 410 preferentially performs a cell search process for a previous serving cell before handover to a current serving cell. As a result, the MS 410 discovers the macro BS 430 (step 425). In other words, the MS 410 detects a signal of the macro BS 430. Accordingly, the MS 410 performs RRC connection re-establishment for the macro BS 430 (step 427). At this time, the macro BS 430 can successfully achieve the RRC connection re-establishment because the macro BS 430 has the context information of the MS 410.

FIG. 4B illustrates a detailed process of the RRC connection re-establishment. Referring to FIG. 4B, the MS 410 transmits an RRC re-establishment request message to the macro BS 430 (step 451). The RRC re-establishment request message includes identification information of an MS, information representing the cause of RRC re-establishment, and Physical Cell IDentifier (PCI) information of a reconnection target cell. The RRC re-establishment request message informs that it intends to re-establish connection with the macro BS 430.

The macro BS 430 receiving the RRC re-establishment request message identifies that a sender of the RRC re-establishment request message is the MS 410, identifies that the context information of the MS 410 has been stored, and performs a Message Authentication Code-Integrity (MAC-I) verification procedure (step 453). Because the macro BS 430 has kept the context information of the MS 410 through a context update procedure, the macro BS 430 determining that the context information has been stored transmits an RRC re-establishment message to the MS 410 (step 455). Next, the macro BS 430 transmits a data forwarding request to a BS previously accessed by the MS 410 (i.e., the pico BS 420 that has previously provided the context update message) (step 459). Along with the data forwarding request, information on a wired bearer to perform data forwarding can be transmitted.

The pico BS 420 receiving the data forwarding request transmits SN state information of the MS 410 to the macro BS 430 (step 461), and the pico BS 420 forwards data for the MS 410 stored in a buffer to the macro BS 430 (step 463). The SN state information represents a progress state of a sequence number for data in a PDCP layer, and is used for data encryption, integrity protection and such. After that, the MS 410 and the macro BS 430 restore connection through an RRC connection reconfiguration procedure (step 465) and transmits/receives a traffic with the macro BS 430 and the S-GW 450 (step 467).

With regard to technique 1), the technique for using the system information update procedure is described below.

When an MS suffers an RLF in a pico cell in an environment where the pico cell is overlapped within a macro cell, there is a great possibility that the MS discovers a macro cell that has previously been connected with the MS. Accordingly, the MS will seek to re-establish connection with a macro BS. At this time, the MS attempts to connect with the macro cell through an RRC connection re-establishment procedure. Prior to performing the RRC connection re-establishment procedure, the MS has to enter a state of being able to transmit/receive a signal with the macro BS through a random access process. To this end, the MS has to acquire system information of the macro BS, particularly, information associated with the random access. Therefore, the MS cannot attempt the RRC connection re-establishment procedure without acquiring the system information of the macro BS. Accordingly, embodiments of the present invention propose a way for the MS to keep the system information of the macro BS.

Figure 5:
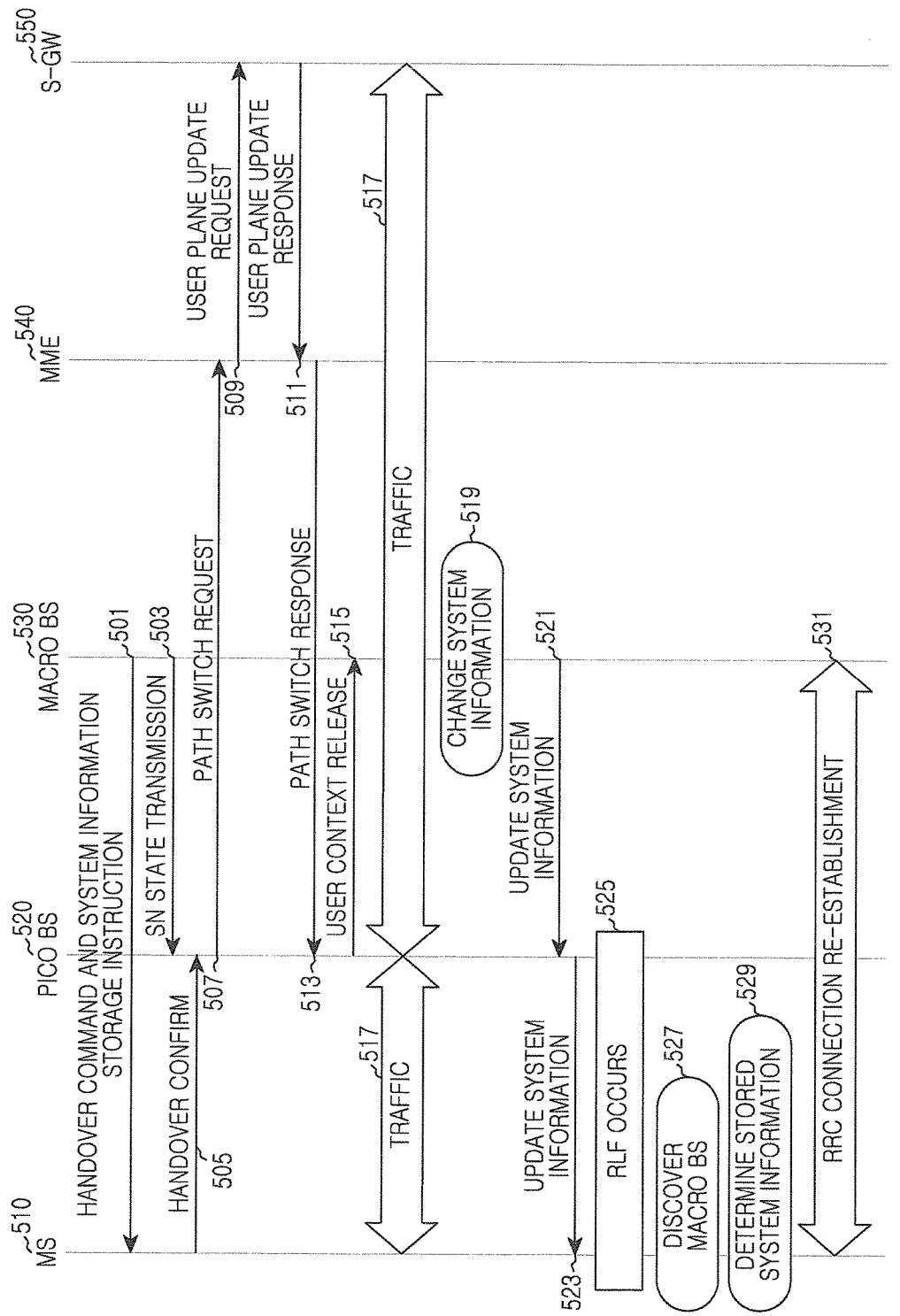
FIG. 5 is a ladder diagram of a signal exchange for an MS to reconnect from a pico cell to a macro cell in a heterogeneous wireless communication system according to a second type of embodiments of the present invention.

FIG. 5 illustrates a signal exchange for an MS to reconnect from a pico cell to a macro cell in a heterogeneous wireless communication system according to a second type of embodiments of the present invention.

Referring to FIG. 5, an MS 510 entering a cell of a pico BS 520 receives a handover command from a macro BS 530 (step 501). Here, the handover command includes a command instructing the MS 510 to store system information of the macro BS 530. For example, the handover command includes an indication associated with system information reuse. When the indication of the system information reuse is set to a value representing affirmation, the MS 510 stores the system information of the macro BS 530. At this time, the MS 510 marks the cell for which the system information is stored. For example, a PCI and center frequency information of the macro BS 530 can be used as cell identification information. Accordingly, although the MS 510 does handover to the pico BS 520, the system information of the macro BS 530 is not discarded.

The macro BS 530 transmits SN state information of the MS 510 to the pico BS 520, i.e. a target BS of handover (step 503). Also, the MS 510 receiving the handover command transmits a handover confirm to the pico BS 520 (step 505).

The pico BS 520 then transmits to the MME 540 a path switch request message informing that a serving cell of the MS 510 changes (step 507), In response, the MME 540 transmits to an S-GW 550 a user plane update request message (step 509), and the S-GW 550 re-establishes a downlink traffic path for the MS 510 and transmits a user plane update response message to the MME 540 (step 511). The MME 540 then transmits a path switch response message to the pico BS 520 (step 513). The pico BS 520 identifying the accomplishment of the path re-establishment then transmits to the macro BS 530 a user context release request for the MS 510 (step 515). Then, the MS 510 maintains the connection with the pico BS 520, and transmits/receives uplink/downlink traffic through the pico BS 520 and the S-GW 550 (step 517).

After the handover is completed through steps of 501 to 517, if the MS 510 suffers an RLF in a pico cell, the MS 510 preferentially searches for the macro BS 530. If the macro BS 530 is found, it is desirable to transmit an RRC connection re-establishment request to the macro BS 530 as quickly as possible. To this end, the MS 510 has to camp on or connect to the macro BS 530 and acquire system information of the macro BS. To reduce a time taken until the MS 510 acquires the system information of the macro BS 530, the macro BS 530 forwards, if its own system information is changed, the changed system information to the MS 510 through the pico BS 520.

That is, the macro BS 530 changes system information by a communication environment or system operator (step 519). So, the macro BS 530 forwards a system information update message including the changed system information to the MS 510 through the pico BS 520 (steps 521 and 523). However, if the system information of the macro BS 530 does not change, steps of 521 and 523 may not occur. If change takes place twice or more, steps of 521 and 523 can also be performed twice or more. At this time, the pico BS 520 transmits the system information update message to the MS 510 in a broadcast, multicast, or unicast. The system information update message includes the system information of the macro BS 530, e.g., can include all information of a Master Information Block (MIB), a System Information Block 1 (SIB 1), an SIB2 and so forth. For example, a construction of the system information update message is shown according to Table 1 below.

TABLE 1

SystemInformationUpdate ::= SEQUENCE {
dl-BandwidthENUMERATED [n6, n15, n25, n50, n75, n100],
phich-ConfigPHICH-Config,
systemFrameNumberBIT STRING (SIZE (8)),
spareBIT STRING (SIZE (10))
cellAccessRelatedInfo SEQUENCE {
plmn-IdentityList PLMN-IdentityList,
trackingAreaCode TrackingAreaCode,
cellIdentity CellIdentity,
cellBarred ENUMERATED {barred, notBarred},
intraFreqReselection ENUMERATED {allowed, notAllowed},
csg-Indication BOOLEAN,
csg-Identity CSG-Identity-r9 OPTIONAL -- Need OR
},
cellSelectionInfo SEQUENCE {
q-RxLevMin Q-RxLevMin,
q-RxLevMinOffset INTEGER (1..8) OPTIONAL -- Need OP
},
p-MaxP-Max OPTIONAL, -- Need OP
freqBandIndicatorINTEGER (1..64),
schedulingInfoListSchedulingInfoList,
tdd-ConfigTDD-Config OPTIONAL, -- Cond TDD
si-WindowLengthENUMERATED {ms1, ms2, ms5, ms10, ms15, ms20, ms40},
systemInfoValueTagINTEGER (0..31),
nonCriticalExtensionSystemInformationBlockType1-v9x0-IEs OPTIONAL-- Need OP TABLE 1-continued

```
ac-BarringInfo SEQUENCE {
ac-BarringForEmergency BOOLEAN,
ac-BarringForMO-Signalling AC-BarringConfig OPTIONAL -- Need OP
ac-BarringForMO-Data AC-BarringConfig OPTIONAL -- Need OP
}OPTIONAL, -- Need OP
radioResourceConfigCommonRadioResourceConfigCommonSIB,
ue-TimersAndConstantsUE-TimersAndConstants,
freqInfo SEQUENCE {
ul-CarrierFreq ARFCN-ValueEUTRA OPTIONAL, -- Need OP
ul-Bandwidth ENUMERATED {n6, n15, n25, n50, n75, n100}
OPTIONAL, -- Need OP
additionalSpectrumEmission AdditionalSpectrumEmission
},
mbsfn-SubframeConfigListMBSFN-SubframeConfigList OPTIONAL, -- Need OR
timeAlignmentTimerCommonTimeAlignmentTimer,
...
}
SystemInformationBlockType1-v9x0-IEs::= SEQUENCE }
imsEmergencySupportIndicator-r9ENUMERATED {supported} OPTIONAL, -- Need
OP
nonCriticalExtensionSEQUENCE { } OPTIONAL -- Need OP
}
PLMN-IdentityList ::= SEQUENCE (SIZE (1..6)) OF PLMN-IdentityInfo
PLMN-IdentityInfo ::= SEQUENCE {
plmn-IdentityPLMN-Identity,
cellReservedForOperatorUseENUMERATED {reserved, notReserved}
}
SchedulingInfoList ::= SEQUENCE (SIZE (1..maxSI-Message)) OF SchedulingInfo
SchedulingInfo ::= SEQUENCE {
si-PeriodicityENUMERATED {rf8, rf16, rf32, rf64, rf128, rf256, rf512},
sib-MappingInfoSIB-MappingInfo
}
SIB-MappingInfo ::= SEQUENCE (SIZE (0..maxSIB-1)) OF SIB-Type
SIB-Type ::=ENUMERATED {sibType3, sibType4, sibType5, sibType6, sibType7,
sibType8, sibType9, sibType10, sibType11, sibType12-v9x0, sibType13-v9x0, spare5,
spare4, spare3, spare2, spare1, ... }
AC-BarringConfig ::= SEQUENCE {
ac-BarringFactorENUMERATED {p00, p05, p10, p15, p20, p25, p30, p40,
p50, p60,p70, p75, p80, p85, p90, p95},
ac-BarringTimeENUMERATED {s4, s8, s16, s32, s64, s128, s256, s512},
ac-BarringForSpecialACBIT STRING (SIZE(5))
}
MBSFN-SubframeConfigList ::= SEQUENCE (SIZE (1..maxMBSFN-Allocations)) OF
MBSFN-SubframeConfig
MBSFN-SubframeConfig ::= SEQUENCE {
radioframeAllocationPeriodENUMERATED {n1, n2, n4, n8, n16, n32},
radioframeAllocationOffsetINTEGER (0..7),
subframeAllocationCHOICE {oneFrame BIT STRING (SIZE(6)),
fourFrames BIT STRING (SIZE(24))}
}
```

The respective fields of Table 1 are defined in Table 2 below.

TABLE 2

| | |
|---|---|
| dl-Bandwidth | Parameter: transmission bandwidth configuration, NRB in downlink, see TS 36.101 [42, table 5.6-1]. n6 corresponds to 6 resource blocks, n15 to 15 resource blocks and so on. |
| systemFrameNumber | Defines the 8 most significant bits of the SFN, see TS 36.211 [21, 6.6.1]. The 2 least significant bits of the SFN are acquired implicitly in the P-BCH decoding, i.e. timing of 40 ms P-BCH TTI indicates 2 least significant bits (within 40 ms P-BCH TTI, the first radio frame: 00, the second radio frame: 01, the third radio frame: 10, the last radio frame: 11). |
| plmn-IdentityList | List of PLMN identities. The first listed PLMN-Identity is the primary PLMN. |
| cellReservedForOperatorUse | As defined in TS 36.304. |
| trackingAreaCode | A trackingAreaCode that is common for all the PLMNs listed. |
| cellBarred | 'barred' means the cell is barred, as defined in TS 36.304. |
| intraFreqReselection | Used to control cell reselection to intra-frequency cells when the highest ranked cell is barred, or treated as barred by the UE, as specified in TS 36.304. |

TABLE 2-continued

| | |
|---|---|
| csg-Indication | If set to TRUE the UE is only allowed to access the cell if the CSG identity matches an entry in the CSG whitelist that the UE has stored. |
| q-RxLevMinOffset | Parameter Qrxlevminoffset in 36.304. Actual value Qrxlevminoffset = IE value * 2 [dB]. If absent, apply the (default) value of 0 [dB] for Qrxlevminoffset. Affects the minimum required Rx level in the cell. |
| p-Max | Value applicable for the cell. |
| freqBandIndicator | Operating band (Defined in TS 36.101 [42, table 5.5-1]) |
| si-Periodicity | Periodicity of the Si-message in radio frames, such that rf8 denotes 8 radio frames, rf16 denotes 16 radio frames, and so on. |
| sib-MappingInfo | List of the SIBs mapped to this SystemInformation message. There is no mapping information of SIB2; it is always present in the first SystemInformation message listed in the schedulingInfoList list. |
| si-Window/Length | Common SI scheduling window for all SIs. Unit in milliseconds, where ms1 denotes 1 millisecond, ms2 denotes 2 milliseconds and so on. |
| systemInfoValueTag | Common for all SIBs other than MIB, SIB1, SIB10 and SIB11. |
| csg-Identity | Identity of the Closed Subscriber Group within the primary PLMN the cell belongs to. The IE is present in a CSG cell. |
| imsEmergencySupportIndicator | Indicates whether the cell supports IMS emergency bearer services for UEs in limited service mode. If absent, IMS emergency call is not supported by the network in the cell for UEs in limited service mode. |
| ac-BarringForEmergency | Access class barring for AC 10. |
| ac-BarringForMO-Signalling | Access class barring for mobile originating signalling. |
| ac-BarringForMO-Data | Access class barring for mobile originating calls. |
| ac-BarringFactor | If the random number drawn by the UE is lower than this value, access is allowed. Otherwise the access is barred. The values are interpreted in the range [0, 1): p00 = 0, p05 = 0.05, p10 = 0.10, . . ., p95 = 0.95. |
| ac-BarringTime | Mean access barring time value in seconds. |
| ac-BarringForSpecialAC | Access class barring for AC 11-15. The first/leftmost bit is for AC 11, the second bit is for AC 12, and so on. |
| ul-CarrierFreq | For FDD: If absent, the (default) value determined from the default TX-RX frequency separation defined in TS 36.101 [42, table 5.7.3-1] applies. For TDD: This parameter is absent and it is equal to the downlink frequency. |
| ul-Bandwidth | Parameter: transmission bandwidth configuration, NRB, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink Bandwidth. For TDD this parameter is absent and it is equal to the downlink bandwidth. |
| mbsfn-SubframeConfigList | Defines the subframes that are reserved for MBSFN in downlink. |
| radioFrameAllocationPeriod, radioFrameAllocationOffset | Radio-frames that contain MBSFN subframes occur when equation SFN mod radioFrameAllocationPeriod = radioFrameAllocationOffset is satisfied. Value n1 for radioframeAllocationPeriod denotes value 1, n2 denotes value 2, and so on. When fourFrames is used for subframeAllocation, the equation defines the first radio frame referred to in the description below. Values n1 and n2 are not applicable when fourFrames is used. |
| subframeAllocation | Defines the subframes that are allocated for MBSFN within the radio frame allocation period defined by the radioFrameAllocationPeriod and the radioFrameAllocationOffset. |
| oneFrame | "1" denotes that the corresponding subframe is allocated for MBSFN. The following mapping applies: FDD: The first/leftmost bit defines the MBSFN allocation for subframe #1, the second bit for #2, third bit for #3, fourth bit for #6, fifth bit for #7, sixth bit for #8. TDD: The first/leftmost bit defines the allocation for subframe #3, the second bit for #4, third bit for #7, fourth bit for #8, fifth bit for #9. Uplink subframes are not allocated. The last bit is not used. |
| fourFrames | A bitmap indicating MBSFN subframe allocation in four consecutive radio frames, "1" denotes that the corresponding subframe is allocated for MBSFN. The bitmap is interpreted as follows: FDD: Starting from the first radioframe and from the first/leftmost bit in the bitmap, the allocation applies to |

TABLE 2-continued subframes #1, #2, #3, #6, #7, and #8 in the sequence of the four radio-frames.
TDD: Starting from the first radioframe and from the first/leftmost bit in the bitmap, the allocation applies to subframes #3, #4, #7, #8, and #9 in the sequence of the four radio-frames. The last four bits are not used. Uplink subframes are not allocated.

The MS 510 then detects an RLF (step 525). In other words, the MS 510 detects that the connection with the pico BS 520 is lost. Accordingly, the MS 510 preferentially searches for the macro BS 530, i.e. the latest accessed macro cell. For example, the MS 510 preferentially performs a cell search process for a previous serving cell before handover to a current serving cell. As a result, the MS 510 discovers the macro BS 530 (step 527). That is, the MS 510 detects a signal of the macro BS 530.

The MS 510 discovering the macro BS 530 determines whether the system information stored in the MS 510 is the system information of the macro BS 530 (step 529). That is, the MS 510 determines whether identification information marked at system information storage is consistent with corresponding information of the macro BS 530. For example, when the system information is indexed to a PCI and center frequency information, if a PCI of the macro BS 530 and a center frequency are consistent with a PCI and a center frequency mapped with the stored system information, the MS 510 determines that it can reuse the stored system information for the macro BS 530.

And, although not illustrated in FIG. 5, the MS 510 uses random access related parameters included in the system information, in a random access process preceding an RRC connection re-establishment procedure. And the MS 510 performs the RRC connection re-establishment procedure with the macro BS 530 (step 531). If the system information stored in the MS 510 is not the system information of the macro BS 530, the MS 510 receives system information broadcasted from the macro BS 530, and then performs the RRC connection re-establishment procedure. At this time, to prevent the erroneous use of the stored system information, the MS 510 discards the stored system information if the RRC connection re-establishment procedure is completed. In other words, if a first RRC connection re-establishment procedure is completed, the stored system information is discarded although not used.

Next, technique 2) is described as follows.

When an MS suffers an RLF in a pico cell in an environment where the pico cell is overlapped within a macro cell, the MS can also restore connection with the macro cell by, instead of performing an RRC connection re-establishment procedure to the macro cell, reusing context information that has previously been used in a macro BS before handover to the pico cell. In this situation, after the macro BS allows the MS to handover to the pico cell, the macro BS stores, without discarding, the context information that was previously used by the MS. The MS also stores, though handing over to the pico cell, the context information that has previously been used in the macro BS, and then restores connection with the macro BS instead of going through a normal handover procedure. For this purpose, the MS transmits a predefined control message for connection restoration, and restores connection with the macro BS by reusing context information that has previously been used in the macro BS. Accordingly, embodiments of the present invention propose a way for the MS to reconnect to the macro cell through a specific control message.

Figure 6:
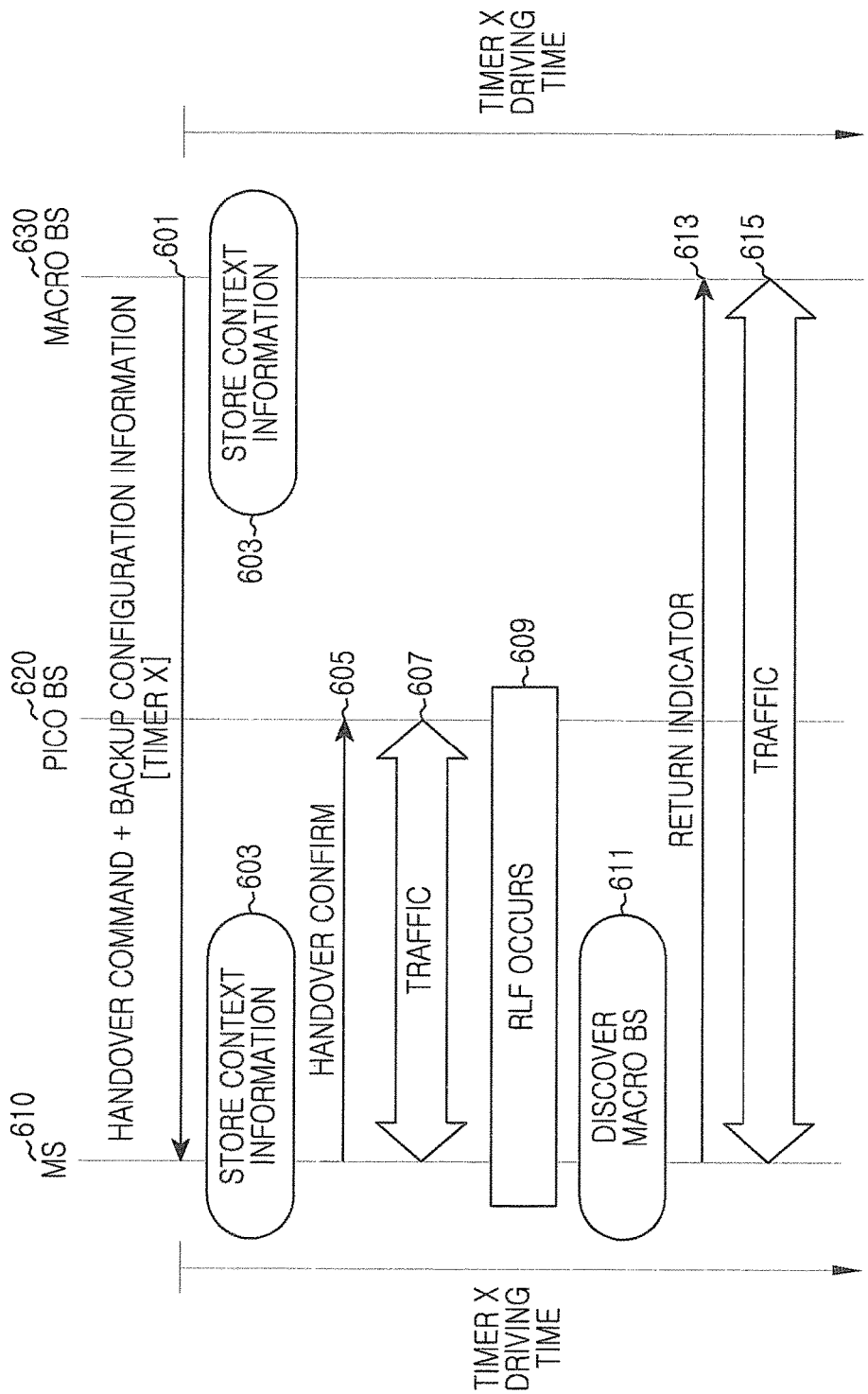
FIG. 6 is a ladder diagram of a signal exchange for an MS to reconnect from a pico cell to a macro cell in a heterogeneous wireless communication system according to a third type of embodiments of the present invention.

FIG. 6 illustrates a signal exchange for an MS to reconnect from a pico cell to a macro cell in a heterogeneous wireless communication system according to a third type of embodiments of the present invention.

Referring to FIG. 6, an MS 610 entering a cell of a pico BS 620 receives a handover command from a macro BS 630 (step 601). Here, the handover command includes backup configuration information for restoration of connection with the macro BS 630. For example, the backup configuration information can include a value of a specific timer representing a time duration for keeping context information with the macro BS 630. Below, the specific timer is called a 'timer X'. That is, the macro BS 630 sets a value of the timer X, and transmits the handover command including the backup configuration information that includes the timer X.

The MS 610 receiving the handover command including the backup configuration information stores context information that was previously used with the macro BS 630, and the macro BS 630 also stores the context information of the MS 610 (step 603). The context information is stored in the MS 610 and the macro BS 630 until the timer X expires. In other words, if the timer X expires, the MS 610 and the macro BS 630 delete the context information. After that, the MS 610 transmits a handover confirm to the pico BS 620 (step 605). As such, a handover procedure is completed among the pico BS 620, the macro BS 630, and the MS 610, and the MS 610 transmits/receives uplink/downlink traffic with the pico BS 620 (step 607). Although not illustrated in FIG. 6, the handover process can include a path switch and user plane update procedure of an MME and S-GW.

Afterwards, the MS 610 detects an RLF (step 609). In other words, the MS 610 detects that its connection with the pico BS 620 is lost. Accordingly, the MS 610 preferentially searches the macro BS 630, i.e. the latest accessed macro cell. For example, the MS 610 preferentially performs a cell search process for a previous serving cell before handover to a current serving cell. As a result, the MS 610 discovers the macro BS 630 (step 611). That is, the MS 610 detects a signal of the macro BS 630.

Accordingly, the MS 610 determines whether the timer X has expired. Here, it is assumed that the timer X has not expired and therefore, the MS 610 transmits a return indicator to the macro BS 630 so as to request connection restoration (step 613). At this time, if the context information of the MS 610 has changed after handover and the current context information is not consistent with the context information stored in step 603, the MS 610 includes information indicating the changed portion in the return indicator. Accordingly, a connection re-establishment procedure between the MS 610 and the macro BS 630 is performed, and then the MS 610 transmits/receives uplink/downlink traffic with the macro BS 630 (step 615).

When restoring connection with a macro cell without a normal handover procedure as shown in FIG. 6, which security key the macro cell should use to perform a security procedure (i.e., data scrambling/descrambling and integrity protection) becomes ambiguous. When a normal handover procedure is performed, a source BS delivers and forwards a security key to a target BS, and the target BS executes the data scrambling/descrambling and integrity protection using the key forwarded from the source BS. A scheme of delivering a security key when the normal handover procedure is performed is illustrated in FIG. 7.

Figure 7:
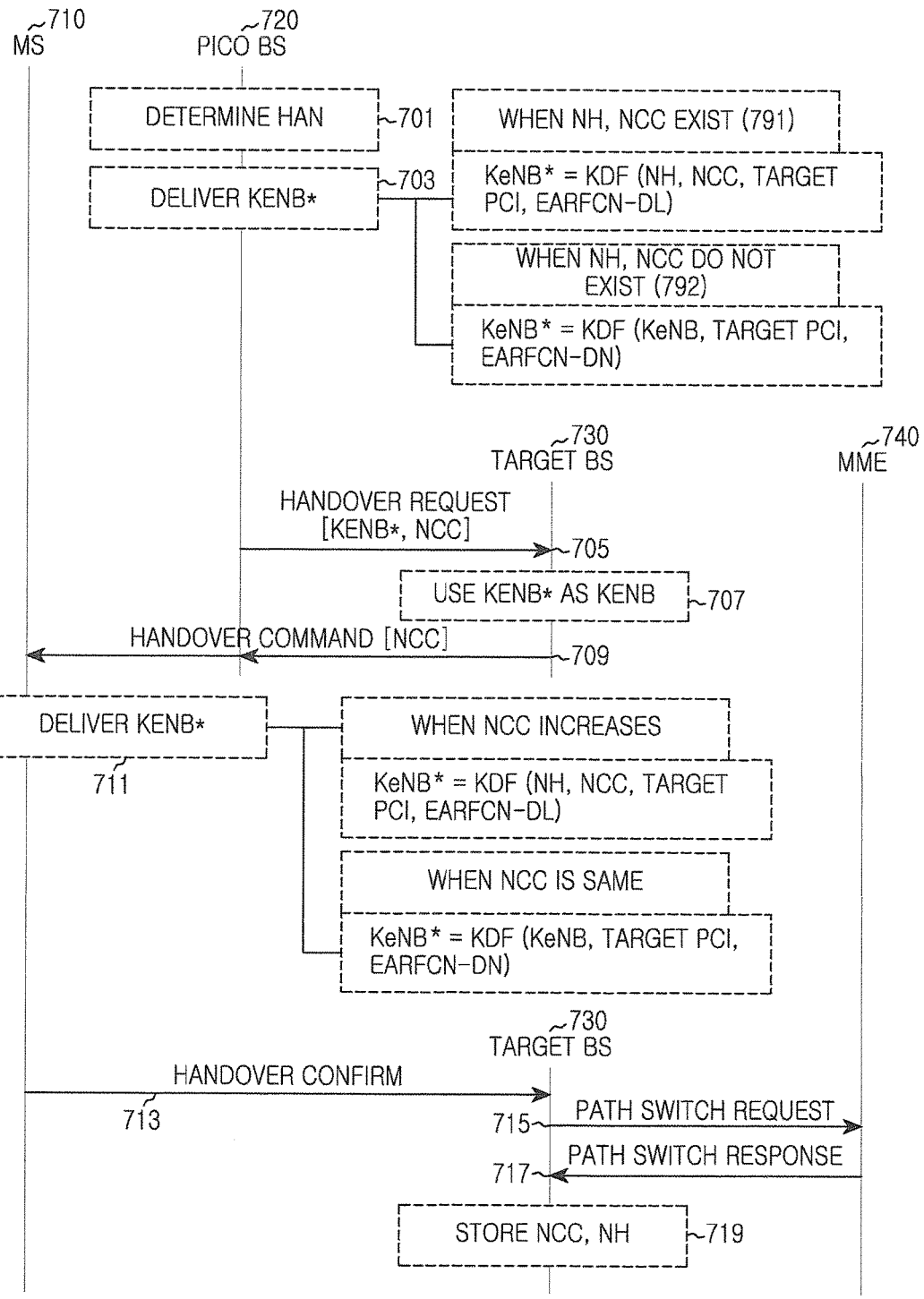
FIG. 7 is a ladder diagram of a scheme for security key delivery in a heterogeneous wireless communication system according to an embodiment of the present invention.

FIG. 7 illustrates a scheme of security key delivery at normal handover in a heterogeneous wireless communication system according to an embodiment of the present invention. Referring to FIG. 7, a source BS 720 determines handover of an MS 710 (step 701), and delivers a security key (hereinafter, referred to as 'KeNB*') on an eNB to be provided to a target BS 730 (step 703). At this time, a KeNB* delivery scheme is different depending on whether a Next Hop (NH) and a Next hop Chaining Counter (NCC) are stored. The NH is a pseudo key provided by an MME 740, and the NH is not used as an actual key but instead a bit stream of the same size as that of a key used for delivering a new key. The NCC is a counter variable representing a change of the NH. When the NH and the NCC have been stored in the source BS 720, the source BS 720 delivers the KeNB* using the NH, the NCC, a PCI of the target BS 730, and frequency information (e.g., Evolved Absolute Radio Frequency Channel Number-Downlink (EARFCN-DL)) as input variables in a Key Delivery Function (KDF) according to a scheme 'A 791'. In contrast, when the NH and the NCC have not been stored in the source BS 720, the source BS 720 delivers the KeNB* using a security key (hereinafter, referred to as 'KeNB') used by the source BS 720, a PCI of the target BS 730, and center frequency information (e.g., EARFCN-DL) as input variables in a KDF according to a scheme 'B 792'. In general, the scheme 'B 792' is a scheme for the exceptional situation in which the NH and the NCC have not been stored.

After that, the source BS 720 transmits a handover request message including the KeNB* and the NCC to the target BS 730 (step 705). In response, the target BS 730 uses the KeNB* as its own KeNB (step 707), and transmits a handover command message including the NCC to the MS 710 (step 709). At this time, the MS 710 determines in which scheme the source BS 720 has delivered the KeNB* based on a value of the NCC, and delivers a KeNB* in the determined scheme (step 711). That is, if the value of the NCC received through the handover command message is the same as a value stored in the MS 710, the MS 710 delivers the KeNB* according to the scheme 'A 791', and if not the same, the MS 710 delivers the KeNB* according to the scheme 'B 792'. Afterwards, the MS 710 transmits a handover confirm message to the target BS 730 (step 713), and in response, the target BS 730 transmits a path switch request to the MME 740 (step 715), and the MME 740 transmits a path switch response including an NCC and an NH to the target BS 730 (step 717). After acquiring the NCC and NH through the path switch response, the target BS 730 stores the NCC and the NH (step 719).

As illustrated in FIG. 7, when an MS performs a handover from a first cell to a second cell, a new security key to be used in the second cell is delivered by a BS of the first cell and is forwarded to a BS of the second cell. Additionally, the MS delivers a new security key through a scheme dependent on an increase or non-increase of an NCC included in a handover command message received from the BS of the second cell. However, when the normal handover procedure of FIG. 6 is not performed, a security key cannot be delivered according to the procedure of FIG. 7 because information on the security key is not exchanged among the first cell, the second cell, and the MS. In other words, in FIG. 6, the MS 610 and the macro BS 630 cannot deliver a security key according to the procedure of FIG. 7.

Thus, embodiments of the present invention propose a method for delivering a new security key to be used in a macro cell when an MS moves from a pico cell to the macro cell using a return indicator.

Although an MS moves from a pico cell to a macro cell without a normal handover procedure, because a macro BS itself is a target cell, the macro BS knows a PCI of a target BS (i.e., the macro BS) and center frequency information among input values for delivering a new key. At this time, whether an NH or a security key that has previously been used in the pico cell is needed comes into question depending on the scheme in which the MS delivers a security key. The NH is provided by an MME and thus, in order for the macro BS to acquire the NH, a new signaling procedure between a macro BS and the MME should be defined. In contrast, because the security key that has previously been used in the pico cell was delivered by the macro BS in a process where the MS performs a handover to a pico BS, the macro BS can know the security key without performing a new procedure.

Therefore, when the MS does handover to the pico BS, the macro BS stores the security key that has previously been used in the pico BS, together with context information of the MS. Afterwards, if a return indicator is received from the MS, the macro BS delivers a new security key using a stored security key, its own PCI and center frequency information, and uses the delivered new security key. Accordingly, the same result is obtained as when the pico BS delivers and forwards a security key according to the scheme 'B 792'.

Figure 8:
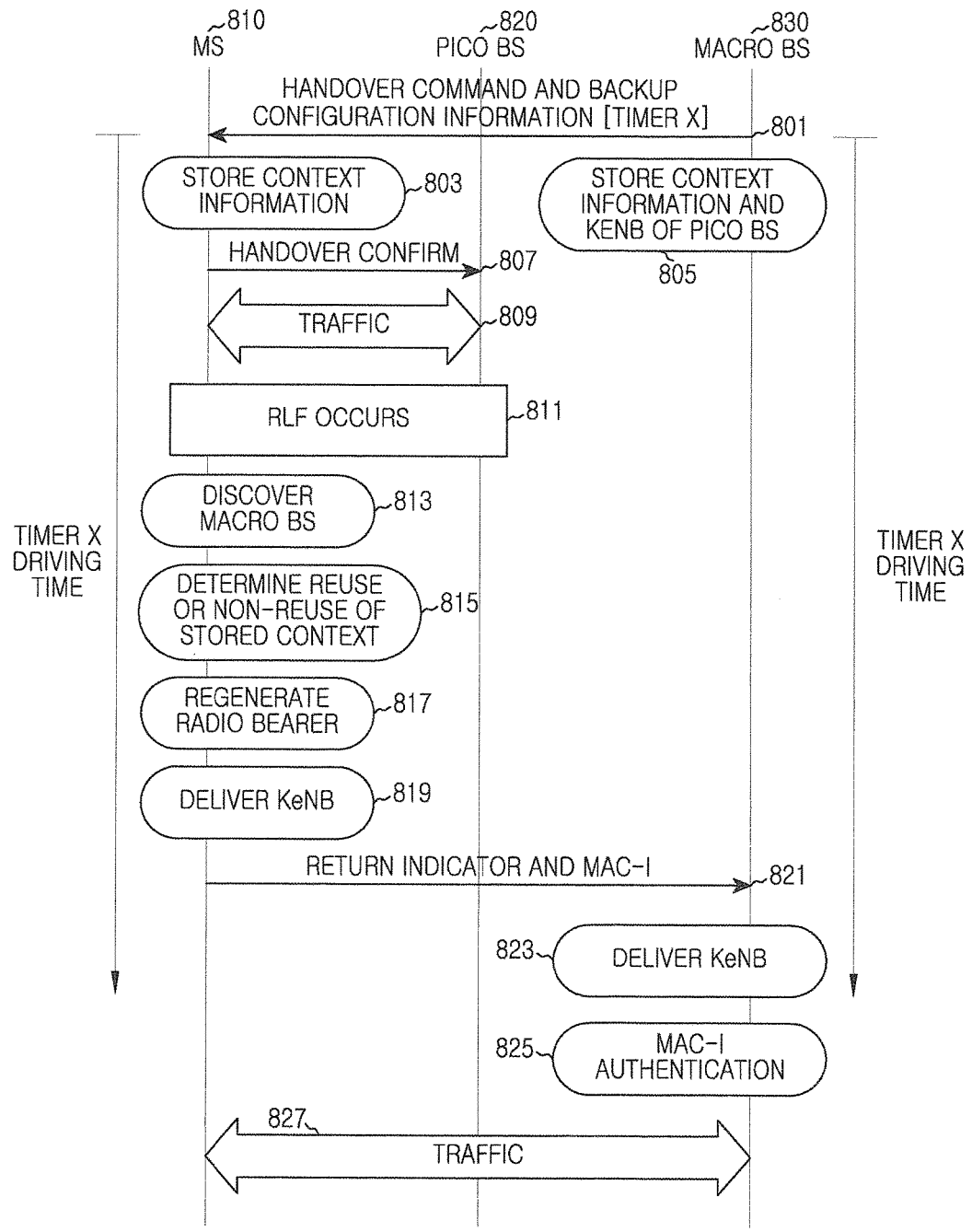
FIG. 8 is a ladder diagram of a signal exchange considering security key delivery when an MS reconnects from a pico cell to a macro cell in a heterogeneous wireless communication system according to the third type of embodiments of the present invention.

FIG. 8 illustrates a signal exchange considering security key delivery when an MS reconnects from a pico cell to a macro cell in a heterogeneous wireless communication system according to the third type of embodiments of the present invention.

Referring to FIG. 8, an MS 810 entering a cell of a pico BS 820 receives a handover command from a macro BS 830 (step 801). Here, the handover command includes backup configuration information for restoration of connection with the macro BS 830. For example, the backup configuration information can include a value of a specific timer representing a time duration for keeping context information with the macro BS 830. Hereinafter, the specific timer is called a 'timer X'. That is, the macro BS 830 sets a value of the timer X, and transmits the handover command including the backup configuration information including the timer X.

The MS 810 receiving the handover command including the backup configuration information stores context information that has previously been used with the macro BS 830 (step 803). At this time, the MS 810 marks to which cell the stored context information corresponds. For example, the MS 810 indexes the stored context information to a PCI of a cell of the macro BS 830 and center frequency information. Or, the MS 810 indexes the context information to a Cell Global Identifier (CGI) of a macro cell. Here, the CGI, which is unique identification information given to each cell within a system of the same service provider is, for example, a size of '28' bits and is broadcasted as system information of a cell. The macro BS 830 stores context information of the MS 810 and a KeNB of the pico BS 820 (step 805). Here, before the handover command of the macro BS 830 is transmitted, the handover command of the macro BS 830 is generated by the macro BS 830. Also, the context information is stored in the MS 810 and the macro BS 830 until the timer X expires. In other words, when the timer X expires, the MS 810 and the macro BS 830 delete the context information.

The MS 810 transmits a handover confirm to the pico BS 820 (step 807). As such, a handover procedure is completed among the pico BS 820, the macro BS 830, and the MS 810, and the MS 810 transmits/receives uplink/downlink traffic with the pico BS 820 (step 809). Although not illustrated in FIG. 8, the handover procedure can include a path switch and user plane update procedure of an MME and S-GW. Afterwards, the MS 810 detects an RLF (step 811). In other words, the MS 810 detects that its connection with the pico BS 820 is lost. Accordingly, the MS 810 preferentially searches for the macro BS 830, i.e. the latest accessed macro cell. For example, the MS 810 preferentially performs a cell search process for a previous serving cell before handover to a current serving cell. As a result, the MS 810 discovers the macro BS 830 (step 813). That is, the MS 810 detects a signal of the macro BS 830, and determines that a channel quality is above a specific threshold.

Accordingly, the MS 810 determines whether it can reuse stored context information for a discovered cell (step 815). In detail, the MS 810 determines whether the discovered cell, i.e. the macro BS 830, is a BS corresponding to the stored context information. Whether the context information corresponds to the macro BS 830 is determined based on the consistency of information indexing the stored context information (i.e., center frequency information and a PCI, or a CGI). Also, the MS 810 determines whether the timer X has expired. Although not illustrated in FIG. 8, if the context information and the macro BS 830 do not correspond to each other or the timer X has expired, the MS 810 performs an RRC connection re-establishment process.

Because the context information and the macro BS 830 correspond to each other and the timer X has not expired, the MS 810 determines that it can reuse the stored context information, and regenerates a radio bearer with the macro BS 830 using the stored context information (step 817). That is, the MS 810 operates as if the MS 810 received an RRC connection reconfiguration message including the stored context information. Next, the MS 810 delivers a new security key (KeNB) to be used in the macro BS 830, using a security key that has previously been used in the pico BS 820 and a PCI of the macro BS 830 and center frequency information (step 819). That is, when the MS 810 performs a normal handover procedure, the MS 810 delivers the new security key in the same scheme as when an NCC does not increase.

After delivering the security key, the MS 810 transmits a return indicator to the macro BS 803 so as to request connection restoration (step 821). At this time, the MS 810 integrity-protects the return indicator using a new security key. That is, the MS 810 applies a predetermined integrity protection algorithm, a new security key, and other input value to the return indicator, generates a Message Authentication Code-Integrity (MAC-I), and transmits the MAC-I together with the return indicator.

The macro BS 830 receiving the return indicator and the MAC-I identifies a C-RNTI of the MS 810, and detects that the MS 810 is an MS returned without a normal handover procedure. Additionally, the macro BS 830 identifies stored context information of the MS 810 and a security key that has previously been used by the MS 810 in the pico BS 820 and then delivers a new security key (KeNB) (step 823). That is, the macro BS 830 delivers the new security key using the security key that has previously been used by the MS 810 in the pico BS 820 and its own PCI and center frequency information. The macro BS 830 authenticates a MAC-I using the new security key (step 825). After that, the MS 810 transmits/receives uplink/downlink traffic with the macro BS 830 (step 827).

In the embodiment of FIG. 8, a situation of a radio bearer can change at the time of connection restoration. That is, an MS regenerates at least one radio bearer according to radio bearer setup information included in the context information. Thus, when the MS 810 stops an existing service or initiates a new service after handover to a pico BS, the radio bearer setup information included in the context information may not be consistent with a current radio bearer situation. For example, if the MS uses services 'a' and 'b' and sets radio bearers 'a' and 'b' before doing handover to the pico BS but stops the service 'a' and initiates a service 'c' after doing the handover to the pico BS, the radio bearer 'a' corresponding to the service 'a' is no longer necessary when the MS re-establishes connection for a macro BS, and a new radio bearer for the service 'c' should be re-set.

Figure 9:
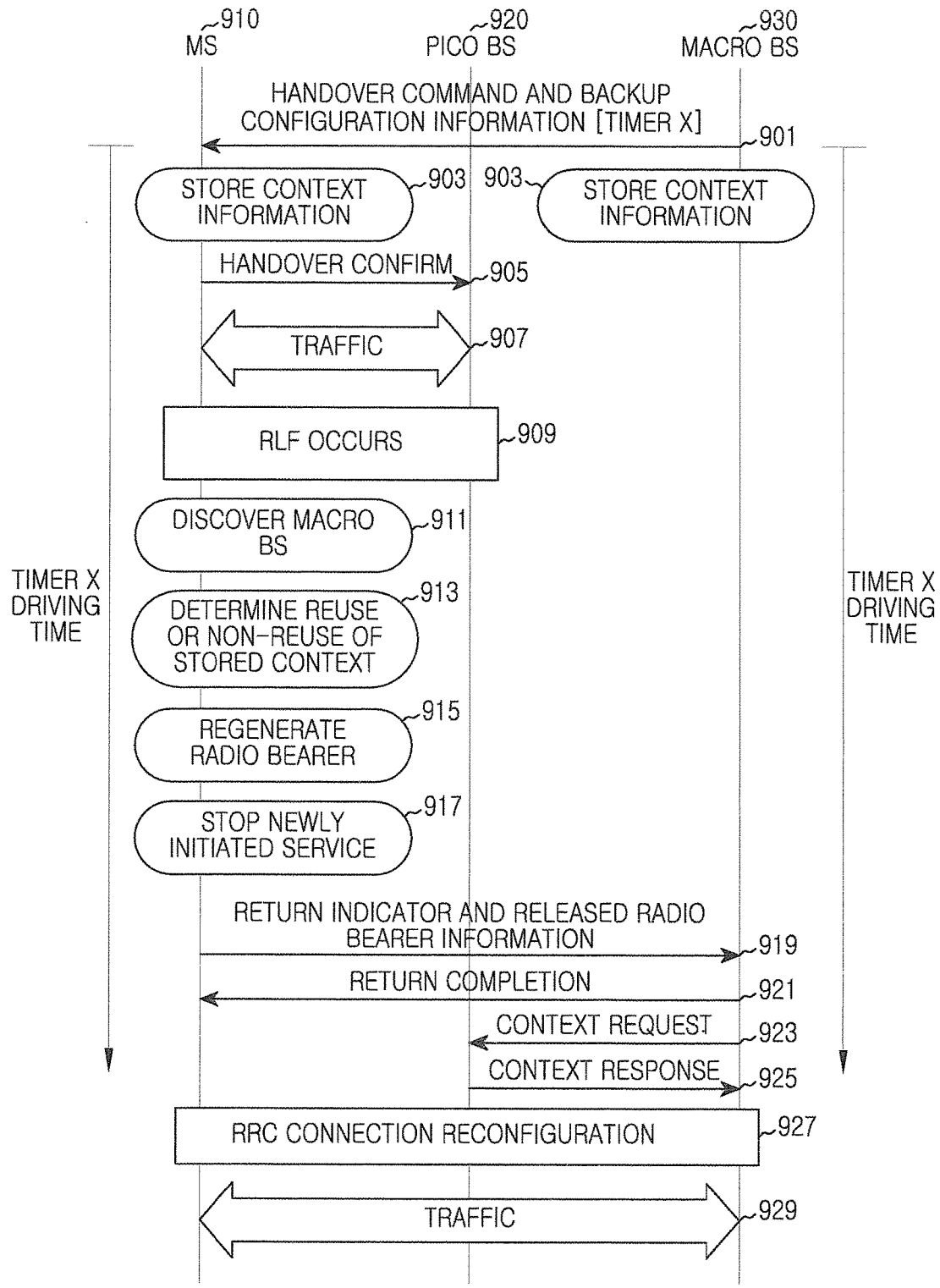
FIG. 9 is a ladder diagram of a signal exchange considering context information change when an MS reconnects from a pico cell to a macro cell in a heterogeneous wireless communication system according to the third type of embodiments of the present invention.

FIG. 9 illustrates a signal exchange considering a change of context information when an MS reconnects from a pico cell to a macro cell in a heterogeneous wireless communication system according to the third type of embodiments of the present invention.

Referring to FIG. 9, an MS 910 entering a cell of a pico BS 920 receives a handover command from a macro BS 930 (step 901). Here, the handover command includes backup configuration information for restoration of connection with the macro BS 930. For example, the backup configuration information can include a value of a specific timer representing a time duration for keeping context information with the macro BS 930. Hereinafter, the specific timer is called a 'timer X'. That is, the macro BS 930 sets a value of the timer X, and transmits the handover command that includes the backup configuration information including the timer X.

The MS 910 receiving the handover command including the backup configuration information stores context information that has previously been used with the macro BS 930, and the macro BS 930 stores the context information of the MS 910 (step 903). At this time, the MS 910 marks to which cell the stored context information corresponds. For example, the MS 910 indexes the stored context information to a PCI of a cell of the macro BS 930 and center frequency information. Alternatively, the MS 910 indexes the context information to a CGI of a macro cell. Here, the CGI, which is unique identification information given to each cell within a system of the same service provider is, for example, a size of '28' bits and is broadcasted as system information of a cell. Also, the context information is stored in the MS 910 and the macro BS 930 until the timer X expires. In other words, when the timer X expires, the MS 910 and the macro BS 930 delete the context information.

After that, the MS 910 transmits a handover confirm to the pico BS 920 (step 905). As such, a handover procedure is completed among the pico BS 920, the macro BS 930, and the MS 910, and the MS 910 transmits/receives uplink/downlink traffic with the pico BS 920 (step 907). Although not illustrated in FIG. 9, the handover procedure can include a path switch and user plane update procedure of an MME and S-GW. After that, the MS 910 detects an RLF (step 909). In other words, the MS 910 detects that its connection with the pico BS 920 is lost. Accordingly, the MS 910 preferentially searches for the macro BS 930, i.e. the latest accessed macro cell. For example, the MS 910 preferentially performs a cell search process for a previous serving cell before handover to a current serving cell. As a result, the MS 910 discovers the macro BS 930 (step 911). That is, the MS 910 detects a signal of the macro BS 930, and determines that a channel quality is above a specific threshold.

Accordingly, the MS 910 determines whether it can reuse stored context information for a discovered cell (step 913). In detail, the MS 910 determines whether the discovered cell, i.e. the macro BS 930, is a BS corresponding to the stored context information. Whether the context information corresponds to the macro BS 930 is determined based on the consistency (or inconsistency) of information indexing the stored context information (i.e., center frequency information and a PCI, or a CGI). Also, the MS 910 determines whether the timer X has expired. Although not illustrated in FIG. 9, if the context information and the macro BS 930 do not correspond to each other or the timer X has expired, the MS 910 performs an RRC connection re-establishment process.

Assuming that the context information and the macro BS 930 correspond to each other and the timer X has not expired, the MS 910 determines that it can reuse the stored context information and regenerates a radio bearer with the macro BS 930 using the stored context information (step 915). That is, the MS 910 operates as if the MS 910 received an RRC connection reconfiguration message including the stored context information. In detail, the MS 910 uses a C-RNTI included in the context information, and regenerates at least one radio bearer according to radio bearer setup information included in the context information. The radio bearer is set up by service held by the MS 910. Thus, when the MS 910 stops an existing service or triggers a new service after handover to a pico BS, the radio bearer setup information included in the context information may not be consistent with that of a current radio bearer situation. For example, if the MS 910 uses services 'a' and 'b' and sets radio bearers 'a' and 'b' before handover to the pico BS but stops the service 'a' and initiates a service 'c' after doing the handover to the pico BS, the radio bearer 'a' corresponding to the service 'a' is no longer necessary at a time the MS 910 re-establishes connection for the macro BS 930, and a new radio bearer for the service 'c' should be set.

Accordingly, when information of a radio bearer for a newly initiated service is not reflected in the stored context information (that is, when there is a newly set radio bearer after handover to the pico BS 920), the MS 910 stops a corresponding service until again generating the newly set radio bearer with the macro BS 930 (step 917). Next, the MS 910 transmits a return indicator to the macro BS 903 so as to request connection restoration (step 919). At this time, the MS 910 transmits, together with the return indicator, information on a radio bearer no longer used at a current time point among radio bearers reflected in the stored context information.

The macro BS 930 receiving the return indicator restores at least one radio bearer with reference to the stored context information and the released radio bearer information and transmits a return completion message to the MS 910 (step 921). Next, the macro BS 930 transmits to the pico BS 920 a request for data forwarding for the MS 810 and context information that has previously been used by the MS 810 in the pico BS 920 (step 923). In response, the pico BS 920 forwards the context infoiuuation of the MS 810 to the macro BS 930 (step 925), and the macro BS 930 determines whether the context information received from the pico BS 920 contains a radio bearer for a new service (i.e. a radio bearer not set through the restoration). When the context information does not contain the radio bearer not set, the macro BS 930 generates a radio bearer for the new service through an RRC connection reconfiguration procedure with the MS 910 (step 927). Consequently, the MS 910 can resume the service stopped in step 917. After that, the MS 910 and the macro BS 930 transmit/receive uplink/downlink traffic (step 929).

An operation and construction of an MS and BS for re-establishing connection as above according to embodiments of the present invention are described below with reference to the drawings.

Figure 10:
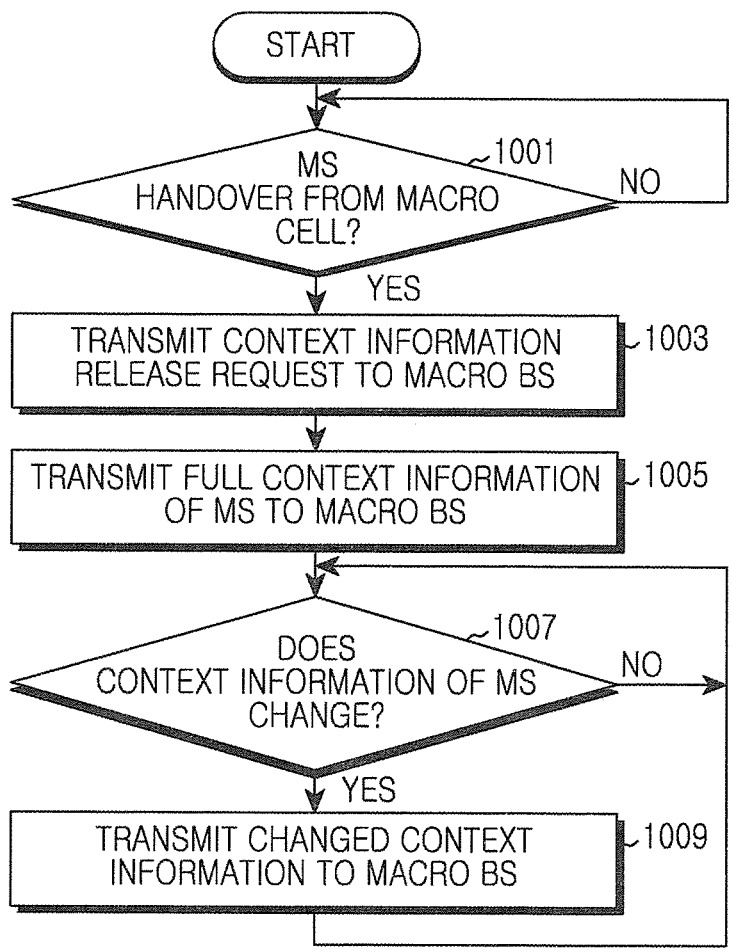
FIG. 10 illustrates a process of a pico Base Station (BS) in a heterogeneous wireless communication system according to the first type of embodiments of the present invention.

FIG. 10 illustrates a process of a pico BS in a heterogeneous wireless communication system according to the first type of embodiments of the present invention.

Referring to FIG. 10, in block 1001, the pico BS identifies whether there is an MS doing handover from a macro cell to the pico BS. In other words, the pico BS receives an MS handover request from a macro BS, determines that it can permit MS handover through admission control, transmits to the macro BS an ACKnowledge (ACK) for the MS handover request, and then identifies whether the MS accesses the pico BS.

If the MS does handover from the macro cell and access the pico BS, the pico BS proceeds to block 1003 and transmits a request for releasing context information of the MS to the macro BS. That is, because the MS accesses the pico BS successfully, the pico BS indicates that there is no need to keep context information of the MS.

Next, the pico BS proceeds to block 1005 and transmits the full context information of the MS to the macro BS. That is, according, to an embodiment of the present invention, the pico BS provides the full context information of the MS to the macro BS such that an RRC connection re-establishment process can succeed for a situation in which the MS reconnects to the macro BS without normal handover (i.e. in a situation where the MS should reconnect to the macro BS without a normal handover process). Block 1005 occurs after the request for releasing the context information in block 1003. As such, if block 1003 is omitted, block 1005 can also be omitted.

The pico BS then proceeds to block 1007 and identifies whether the context information of the MS has changed. The context information includes measurement configuration used by the MS, radio resource related information, in detail, bearer configuration information, Media Access Control (MAC) layer configuration information, physical layer related information and such, Cell-Radio Network Temporary Identifier (C-RNTI), security related information, and so forth. Thus, the context information can change if a radio bearer is generated or becomes obsolete between the start and end of service.

If the context information changes, the pico BS proceeds to block 1009 and transmits the changed context information to the macro BS. That is, the pico BS provides the changed context information to the macro BS such that the macro BS can keep the latest context information. After that, the pico BS returns to block 1007.

Although not illustrated in FIG. 10, when a signal intensity for the MS decreases below a threshold, the pico BS can transmit the context information of the MS to the macro BS. Also, after the connection with the MS fails without handover, if data forwarding is requested from the macro BS, the pico BS forwards SN state information of the MS and data to be transmitted to the MS, to the macro BS.

Figure 11:
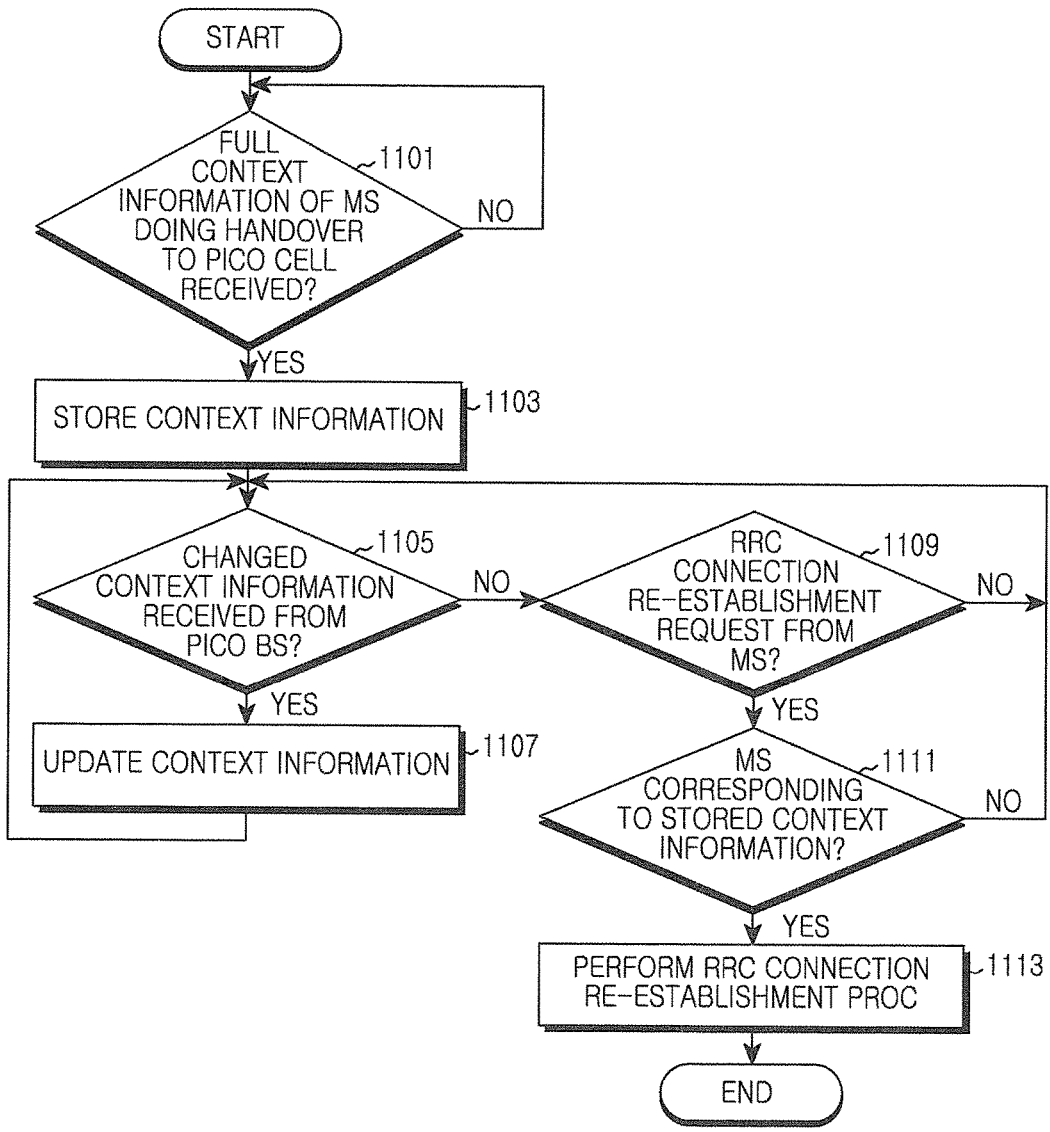
FIG. 11 illustrates a process of a macro BS in a heterogeneous wireless communication system according to the first type of embodiments of the present invention.

FIG. 11 illustrates a process of a macro BS in a heterogeneous wireless communication system according to the first type of embodiments of the present invention.

Referring to FIG. 11, in block 1101, the macro BS identifies whether context information of an MS doing handover to a pico cell of a pico BS is received from the pico BS. That is, the macro BS commands the MS to do handover to the pico BS according to a measurement report of the MS. After the MS completes the handover to the pico BS, the macro BS identifies whether the context information of the MS is received from the pico BS.

If the context information of the MS is received from the pico BS, the macro BS proceeds to block 1103 and stores the received context information. That is, the macro BS stores the context information of the MS such that an RRC connection re-establishment process can succeed in a situation where the MS should reconnect to the macro BS without a normal handover process. Blocks 1101 and 1103 are performed on the premise that the context information of the MS has been discarded after the handover of the MS. Thus, blocks 1101 and 1103 may not be performed if previous context information is not discarded.

After that, the macro BS proceeds to block 1105 and identifies whether changed context information is received from the pico BS. The context information can change in a process in which the MS performs communication with the pico BS after doing handover to the pico cell. The pico BS provides the changed context information to the macro BS such that the macro BS can keep the latest context information. That is, the macro BS identifies whether context information received in block 1105 is different compared to the context information received in block 1101.

If changed context information is received from the pico BS in block 1105, the macro BS proceeds to block 1107 and updates stored context information using the changed context information. After that, the macro BS returns to block 1105.

If the changed context information is not received in block 1105, the macro BS proceeds to block 1109 and identifies whether an RRC connection re-establishment request is received from the MS. That is, the macro BS identifies whether an RRC connection re-establishment request message is received from the MS. Although not illustrated in FIG. 11, a random access process can be first carried out before the RRC connection re-establishment request message is received.

If the RRC connection re-establishment request is received from the MS in block 1109, the macro BS proceeds to block 1111 and determines whether the MS transmitting the RRC connection re-establishment request is an MS corresponding to the stored context information, based on the sender's identification information included in the RRC connection re-establishment request message. In other words, the macro BS determines whether the RRC connection re-establishment request is received from the MS corresponding to the stored context information.

If the MS transmitting the RRC connection re-establishment request is the MS corresponding to the stored context information in block 1111, the macro BS proceeds to block 1113 and performs an RRC connection re-establishment process according to the request of the MS. That is, because the macro BS has the context information of the MS, the macro BS can perform the RRC connection re-establishment process. In detail, the macro BS receives an RRC re-establishment request message from the MS, determines that the context information of the MS has been stored, performs a MAC-I authentication process for the MS, transmits an RRC re-establishment message, and transmits a request for data forwarding to the pico BS.

Figure 12:
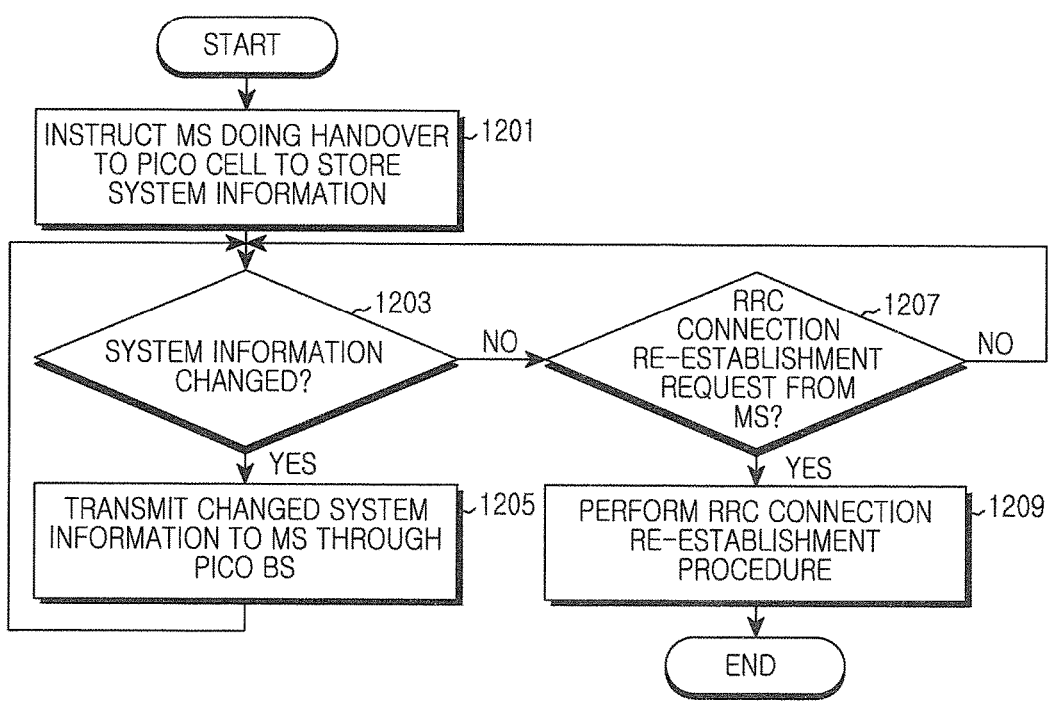
FIG. 12 illustrates a process of a macro BS in a heterogeneous wireless communication system according to the second type of embodiments of the present invention.

FIG. 12 illustrates a process of a macro BS in a heterogeneous wireless communication system according to the second type of embodiments of the present invention.

Referring to FIG. 12, in block 1201, the macro BS transmits an instruction for storing system information of the macro BS to an MS doing handover to a pico cell. That is, the macro BS determines handover to a pico BS according to a measurement report of the MS, performs a process for handover and then, when transmitting a handover command to the MS, transmits to the MS the instruction for storing the system information of the macro BS together with the handover command.

After that, the macro BS proceeds to block 1203 and identifies whether the system information of the macro BS changes. The system information, which is setup information necessary for accessing the macro BS, can change according to an operation state or setup state of the macro BS.

If the system information of the macro BS changes in block 1203, the macro BS proceeds to block 1205 and transmits the changed system information to the MS through the pico BS. That is, the macro BS transmits to the pica BS a system information update message including the changed system information, and then the pico BS forwards the system information message to the MS in a broadcast, multicast or unicast scheme. For example, the system information update message can be configured according to Table 1 above.

In contrast, if the system information of the macro BS does not change in block 1203, the macro BS proceeds to block 1207 and identifies whether an RRC connection re-establishment request is received from the MS. That is, the macro BS identifies whether the RRC connection re-establishment request message is received from the MS. Although not illustrated in FIG. 12, a random access process can be carried out before the RRC connection re-establishment request message is received.

If the RRC connection re-establishment request is received from the MS in block 1207, the macro BS proceeds to block 1209 and performs an RRC connection re-establishment process. At this time, the RRC connection re-establishment process can fail if the macro BS has not stored the context information of the MS.

Figure 13:
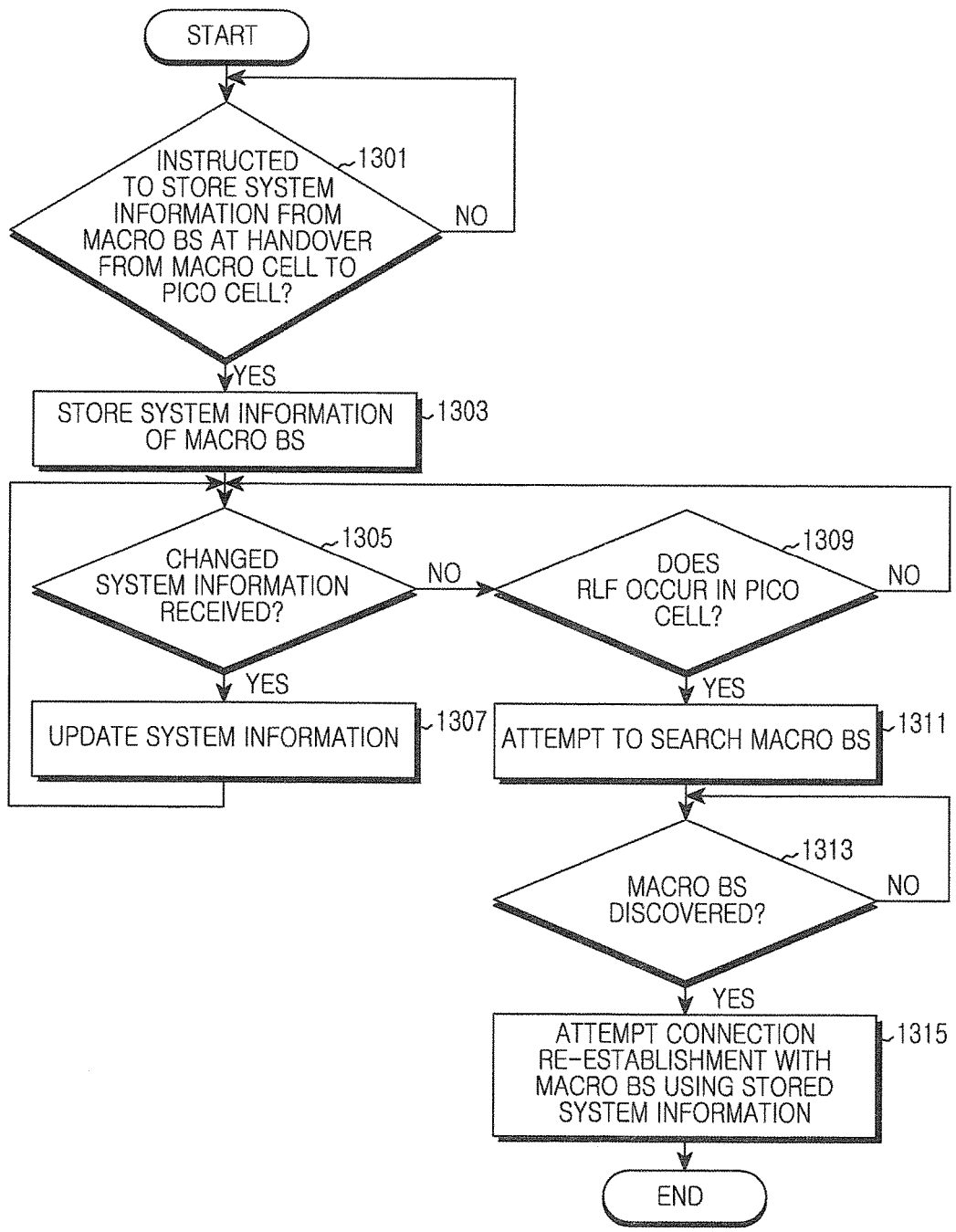
FIG. 13 illustrates a process of an MS in a heterogeneous wireless communication system according to the second type of embodiments of the present invention.

FIG. 13 illustrates a process of an MS in a heterogeneous wireless communication system according to the second type of embodiments of the present invention.

Referring to FIG. 13, in block 1301, the MS identifies whether it receives an instruction for storing system information from a macro BS at handover from a macro cell to a pico cell. That is, the MS identifies whether it has received the instruction for storing the system information together with a handover command received from the macro BS.

If the instruction for storing the system information has been received, the MS proceeds to block 1303 and stores the system information of the macro BS. The system information, which is setup information necessary for accessing the macro BS, represents information received through an MIB, an SIB and such. For example, the system information includes at least one of the fields of Table 2 above. At this time, the MS marks which cell to which the stored system information corresponds. For example, the MS can use a PCI of the macro BS and center frequency information as cell identification information.

After that, the MS proceeds to block 1305 and identifies whether changed system information is received from the macro BS. That is, when the system information changes, the macro BS transmits a system information update message including the changed system information to the MS through the pico BS. At this time, the system information update message is received from the pico BS in a broadcast, multicast or unicast scheme. For example, the system information update message can be configured according to Table 1 above.

If the changed system information is received from the macro BS in block 1305, the MS proceeds to block 1307 and updates stored system information using the changed system information. That is, the MS maintains the system information of the macro BS in the latest state.

In contrast, if the changed system information is not received from the macro BS in block 1305, the MS proceeds to block 1309 and determines whether an RLF takes place in the pico cell. In other words, the MS detects that its connection with the pico BS is not kept. For example, the MS detects the RLF if a channel quality with the pico BS is deteriorated below a threshold or a synchronization signal of the pico BS cannot be detected.

If the RLF takes place, the MS proceeds to block 1311 and preferentially performs a cell search process for the macro BS. In other words, the MS determines whether a signal of the macro BS, which is a BS that has been previously accessed before the pico BS, is received. For example, the MS attempts to detect a synchronization signal of the macro BS and such.

Next, the MS proceeds to block 1313 and determines whether it discovers the macro BS. That is, the MS detects a signal of the macro BS, and deter mines whether it is in a state of being capable of performing communication with the macro BS. For example, whether it is in a state of being capable of performing communication with the macro BS is determined through a channel quality, synchronization signal detection (or non-detection), system information decoding possibility (or impossibility), and so forth.

If the macro BS is discovered, the MS proceeds to block 1315 and attempts RRC connection re-establishment with the macro BS using the stored system information of the macro BS. That is, the MS performs a random access process using random access related parameters included in the system information and then transmits an RRC connection re-establishment request to the macro BS.

Figure 14:
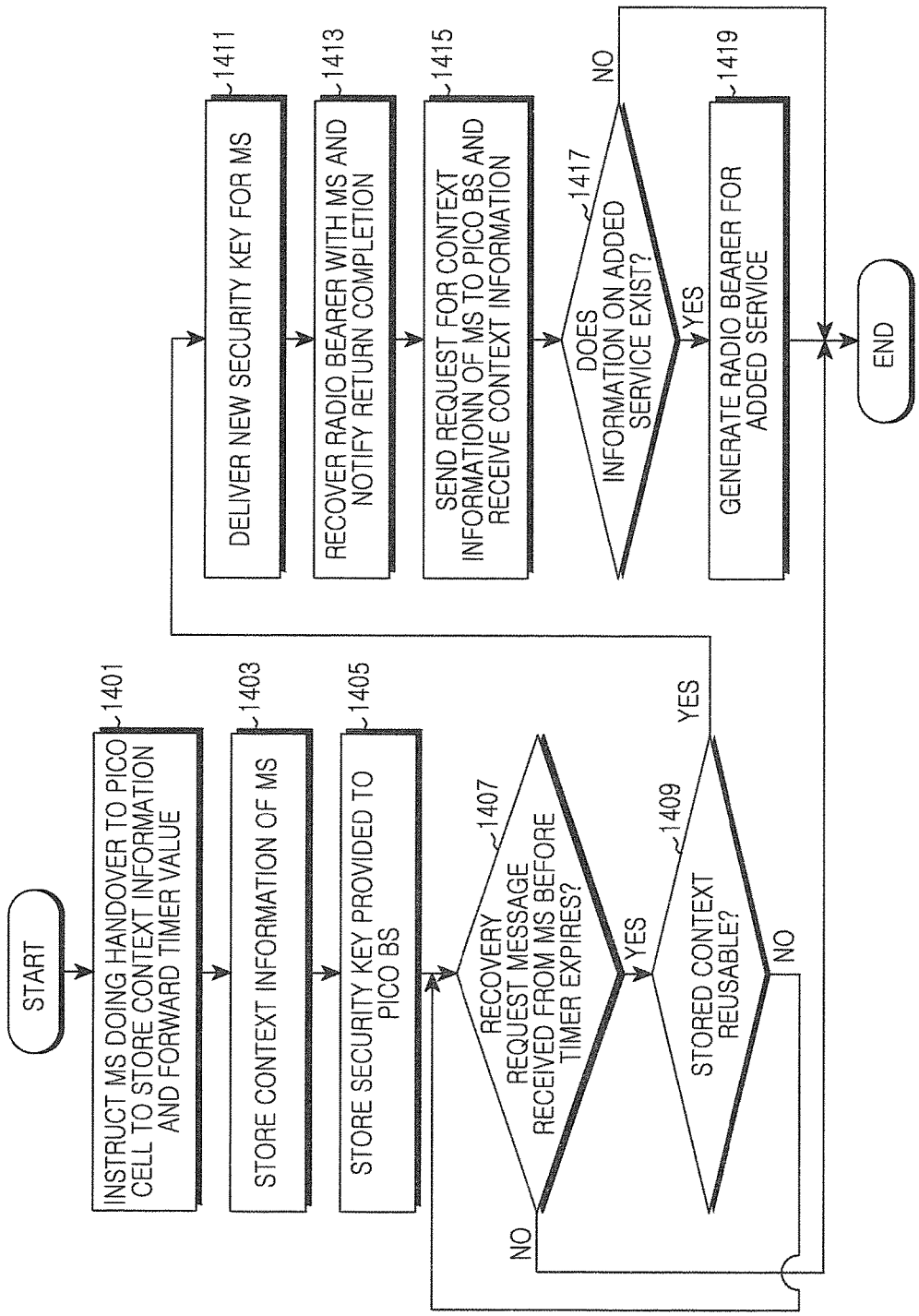
FIG. 14 illustrates a process of a macro BS in a heterogeneous wireless communication system according to the third type of embodiments of the present invention.

FIG. 14 illustrates a process of a macro BS in a heterogeneous wireless communication system according to the third type of embodiments of the present invention.

Referring to FIG. 14, in block 1401, the macro BS transmits an instruction for storing context information of an MS doing handover to a pico cell, to the MS, and forwards a timer value to the MS. Here, the timer value indicates a time for storing of the context information. That is, the macro BS determines handover to a pico BS according to a measurement report of the MS, performs a process for handover, and then, when transmitting a handover command to the MS, the macro BS transmits to the MS the instruction for storing, together with the handover command, the context information that has previously been used when the MS accesses the macro BS.

Next, the macro BS proceeds to block 1403 and stores the context information of the MS. That is, the macro BS transmits to the MS the instruction for storing the context information of the MS and also stores the context information of the MS. Accordingly, the context information is stored in the MS and the macro BS until the timer expires.

After storing the context information of the MS, the macro BS proceeds to block 1405 and stores a security key provided to the pico BS. If normal handover is carried out, a serving BS delivers a security key to be used by a target BS and provides the security key to the target BS. Thus, the macro BS delivers the security key to be used by the pico BS, for the MS. At this time, if the security key is forwarded to the pico BS, the security key becomes information unnecessary for the macro BS. However, according to an embodiment of the present invention, the macro BS stores a security key provided to the pico BS for a situation where the MS reconnects to the macro BS without the normal handover.

After storing the security key, the macro BS proceeds to block 1407 and identifies whether a recovery request message is received from the MS before the expiration of the timer. Here, the recovery request message is a control message for the MS to make a request for resuming connection with the macro BS without the normal handover or an RRC connection re-establishment process. For example, the recovery request message includes at least one of a return indicator for requesting connection resume, a MAC-I for security authentication, and radio bearer information that becomes obsolete after the handover to the pico BS. If the timer expires without receiving the recovery request message, the macro BS terminates the process according to the embodiment of the present invention.

In contrast, if the recovery request message is received before the expiration of the timer in block 1407, the macro BS proceeds to block 1409 and determines whether it is possible to reuse the context information stored in block 1403. That is, the macro BS determines whether the MS transmitting the recovery request message is an MS that corresponds to the stored context information. For example, the macro BS compares sender's identification information included in the recovery request message with MS's identification information included in the stored context information.

If it is possible to reuse the stored context information, the macro BS proceeds to block 1411 and delivers a new security key for the MS. That is, the macro BS delivers a new security key using the security key that has previously been used by the MS in the pico BS and its own PCI and center frequency information. Next, although not illustrated in FIG. 14, the macro BS can authenticate a MAC-I included in the recovery request message using the new security key.

After that, the macro BS proceeds to block 1413 and recovers at least one radio bearer with the MS according to the stored context information. When obsolete radio bearer information is included in the received recovery request message of block 1407, the macro BS restores only a radio bearer with the exception of the obsolete radio bearer. In addition, the macro BS notifies the MS of connection return completion.

After recovering the at least one radio bearer in block 1413, the macro BS proceeds to block 1415 and transmits a request for context information of an MS to the pico BS and acquires the context information from the pico BS. That is, because the context information of the MS can change after being stored in block 1403, the macro BS transmits the context information request to the pico BS in order to acquire the latest context information.

After acquiring the context information from the pico BS in block 1415, the macro BS proceeds to block 1417 and determines whether information on service added to the latest context information exists. In other words, the macro BS determines whether there is information not included in the stored context information of block 1403, among information on service included in the latest context information. That is, the macro BS determines whether a radio bearer generated after handover to the pico cell exists using the latest context information and, accordingly, whether a radio bearer to be additionally generated exists.

If the information on the added service exists, the macro BS proceeds to block 1419 and generates a radio bearer for the added service. The macro BS then transmits/receives traffic with the MS.

Figure 15:
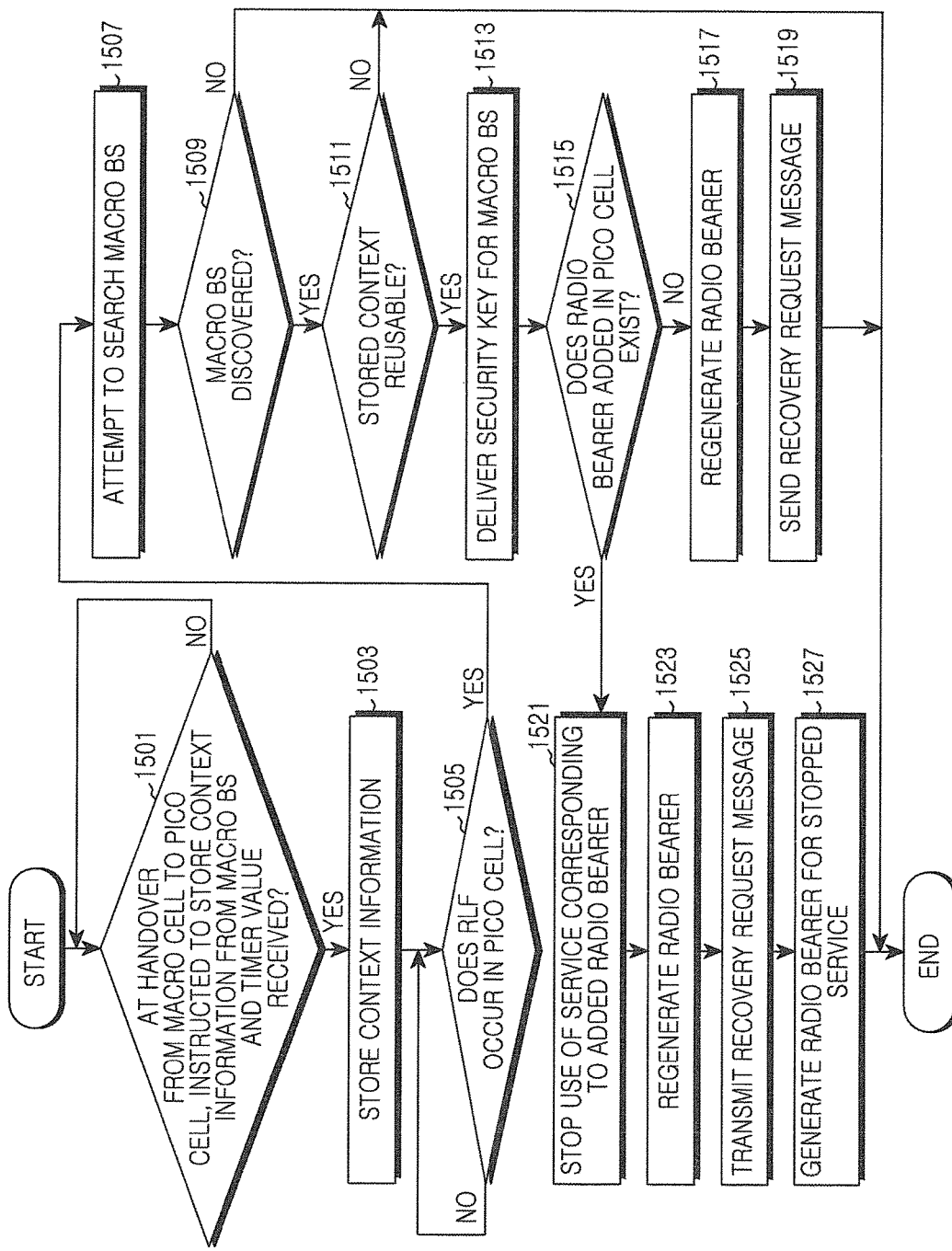
FIG. 15 illustrates a process of an MS in a heterogeneous wireless communication system according to the third type of embodiments of the present invention.

FIG. 15 illustrates a process of an MS in a heterogeneous wireless communication system according to the third type of embodiments of the present invention.

Referring to FIG. 15, in block 1501, the MS identifies whether a context information storage instruction and a timer value are received from a macro BS during a handover from a macro cell to a pico cell. Here, the timer value indicates a time to maintain the storing of the context information. That is, the MS determines whether it has received an instruction for storing the context information that has previously been used when the MS accesses the macro BS, together with a handover command received from the macro BS.

If the context information storage instruction and timer value are received in block 1501, the MS proceeds to block 1503 and stores context information that has previously been used during an access to the macro BS. At this time, the MS marks which cell to which the stored context information corresponds. For example, the MS indexes the stored context information to a PCI of the macro BS and center frequency information. Alternatively, the MS indexes the stored context information to a CGI of a macro cell.

After that, the MS proceeds to block 1505 and determines whether an RLF has occurred in the pico cell. In other words, the MS detects whether its connection with the pico BS is lost. For example, the MS detects the RLF when a channel quality with the pico BS is deteriorated below a threshold or a synchronization signal of the pico BS cannot be detected.

If the RLF takes place, the MS proceeds to block 1507 and preferentially performs a cell search process for the macro BS. In other words, the MS determines whether a signal of the macro BS (i.e. a BS that has previously been accessed before the pico BS) is received. For example, the MS attempts to detect a synchronization signal of the macro BS and such.

Next, the MS proceeds to block 1509 and identifies whether it has discovered the macro BS. That is, the MS detects a signal of the macro BS, and determines whether it is in a state of being capable of performing communication with the macro BS. For example, whether the MS can perform communication with the macro BS is determined through a channel quality, synchronization signal detection (or non-detection), system information decoding possibility (or impossibility), and so forth. If it fails to discover the macro BS, the MS terminates the process according to an embodiment of the present invention.

If the macro BS is detected, the MS proceeds to block 1511 and determines whether the stored context information can be reused. That is, the MS determines whether the macro BS is a BS corresponding to the stored context information. Whether the context information corresponds to the macro BS is determined based on the consistency (or inconsistency) of information indexing the stored indexing information (i.e., center frequency information and a PCI, or a CGI). Also, the MS determines whether the timer X has expired. If the MS cannot reuse the stored context information in block 1511, the MS terminates the process according to the embodiment of the present invention.

If the MS can reuse the stored context information in block 1511, the MS proceeds to block 1513 and delivers a security key for the macro BS. In other words, the MS delivers a new security key to be used in the macro BS by using a security key that has previously been used in the pico BS and a PCI of the macro BS and center frequency information. That is, when the MS performs a normal handover procedure, the MS delivers the new security key in the same scheme as when an NCC does not increase.

After that, the MS proceeds to block 1515 and determines whether a radio bearer added after handover to the pico cell exists. That is, the MS determines whether the added radio bearer exists by newly generating service after the handover to the pico cell. Here, the existence (or non-existence) of the added radio bearer is determined based on whether any information on service included in the latest context information is not included in the stored context information of block 1503.

If the added radio bearer does not exist in block 1515, the MS proceeds to block 1517 and regenerates at least one radio bearer that has previously been used with the macro BS according to the context information stored in block 1503. At this time, if a radio bearer that is obsolete after the handover to the pico cell exists, the MS regenerates only a radio bearer with the exception of the obsolete radio bearer.

After regenerating the at least one radio bearer in block 1517, the MS proceeds to block 1519 and transmits a recovery request message to the macro BS. Here, the recovery request message is a control message for requesting the MS to resume connection with the macro BS without normal handover or an RRC connection re-establishment process. For example, the recovery request message includes at least one of a return indicator for requesting connection resume, a MAC-I for security authentication, and radio bearer information that is obsolete after handover to a pico BS. Accordingly, the at least one radio bearer is restored in the macro BS, and the MS performs communication with the macro BS.

If the added radio bearer exists in block 1515, the MS proceeds to block 1521 and temporarily stops service provided through the added radio bearer. Because the macro BS cannot know information on the radio bearer added in the pico cell, the MS cannot be provided with the service through the added radio bearer until the same radio bearer as the added radio bearer is newly generated.

Next, the MS proceeds to block 1523 and regenerates at least one radio bearer that has previously been used with the macro BS according to the context information stored in block 1503. At this time, if a radio bearer that is obsolete after handover to the pico cell exists, the MS regenerates only a radio bearer with the exception of the extinct radio bearer.

After regenerating the at least one radio bearer in block 1523, the MS proceeds to block 1525 and transmits a recovery request message to the macro BS. Here, the recovery request message is a control message for requesting the MS to resume connection with the macro BS without normal handover or an RRC connection re-establishment process. For example, the recovery request message includes at least one of a return indicator for requesting connection resume, a MAC-I for security authentication, and radio bearer information that is obsolete after handover to a pico BS.

After that, in block 1527, the MS generates a radio bearer for the service stopped in block 1521. Accordingly, all radio bearers that have previously been used in the pico cell between the macro BS and the MS are recovered, and the MS performs communication with the macro BS.

Figure 16:
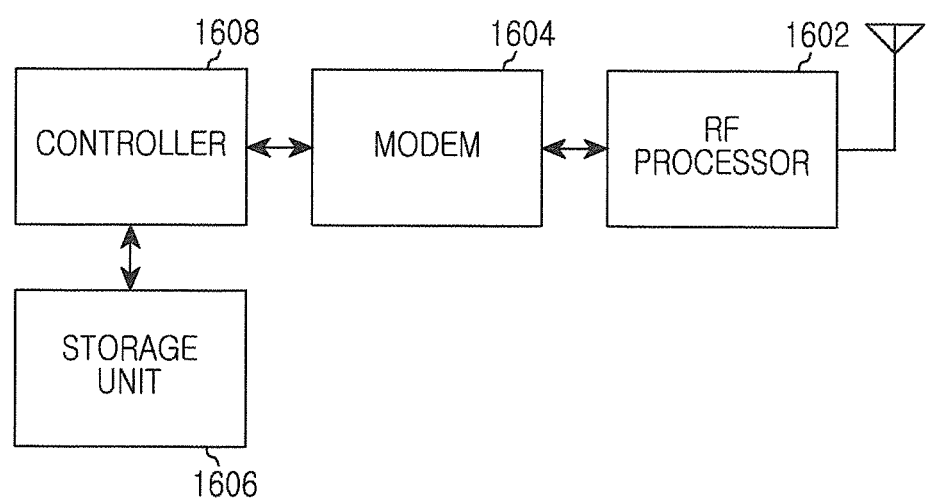
FIG. 16 is a block diagram of an MS in a heterogeneous wireless communication system according to an embodiment of the present invention.

FIG. 16 illustrates an MS in a heterogeneous wireless communication system according to an embodiment of the present invention.

As illustrated in FIG. 16, the MS includes a Radio Frequency (RF) processor 1602, a modem 1604, a storage unit 1606, and a controller 1608.

The RF processor 1602 performs a function for transmitting/receiving a signal through a wireless channel, such as signal band conversion, amplification, and so forth. That is, the RF processor 1602 up converts a baseband signal provided from the modem 1604 into an RF band signal and transmits the RF band signal through an antenna, and down converts an RF band signal received through the antenna into a baseband signal.

The modem 1604 performs a function of conversion between a baseband signal and a bit stream according to a physical layer standard of a system. For example, during data transmission, the modem 1604 generates complex symbols by encoding and modulating a transmit bit stream, maps the complex symbols to subcarriers, and configures Orthogonal Frequency Division Multiplexing (OFDM) symbols through Inverse Fast Fourier Transform (IFFY) operation and Cyclic Prefix (CP) insertion. Also, during data reception, the modem 1604 divides a baseband signal provided from the RF processor 1602 in an OFDM symbol unit, restores signals mapped to subcarriers through Fast Fourier Transform (FFT) operation, and restores a reception bit stream through demodulation and decoding. Also, the modem 1604 measures a channel quality using a receive signal, and detects a physical signal such as a synchronization signal and such.

The storage unit 1606 stores a program necessary for an operation of the MS, setup information, temporary data, and such. For example, the setup information includes system information of a BS, context information of the MS, authentication key information, and so forth.

The controller 1608 controls general functions of the MS. For example, the controller 1608 generates a data packet and provides the data packet to the modem 1604, and analyzes and processes a data packet provided from the modem 1604. Also, the controller 1608 interprets a control message received through the modem 1604, performs operation corresponding to the control message, processing and such, and generates a control message to be transmitted to a BS. Also, the controller 1608 determines a channel situation through channel quality information, a decoding success rate, a physical signal detection result, and such, which are provided from the modem 1604.

Particularly, the controller 1608 controls a function for reconnecting to a macro BS when an RLF occurs in a pico cell. A function of the controller 1608 for reconnecting to the macro BS is described below.

According to the second type of embodiments of the present invention, the controller 1608 operates as follows to reconnect to the macro BS when an RLF takes place in the pico cell. The controller 1608 determines that it has received an instruction for storing system information from a macro BS during handover from a macro cell to a pico cell, and stores the system information in the storage unit 1606 such that the system information of the macro BS is not discarded after handover. At this time, the controller 1608 which cell to which the stored system information corresponds. For example, a PCI of the macro BS and center frequency information can be used as cell identification information. After that, if changed system information is received from a pico BS, i.e. the current serving BS, the controller 1608 updates the system information stored in the storage unit 1606 using the changed system information. After that, if an RLF takes place in the pico cell, the controller 1608 preferentially performs a cell search process for the macro BS through the modem 1604, and as a result, if it discovers the macro BS, the controller 1608 attempts connection re-establishment with the macro BS using the system information of the macro BS stored in the controller 1606. That is, the controller 1608 performs a random access process using random access related parameters included in the system information and then transmits a request for RRC connection re-establishment to the macro BS.

According to the third type of embodiments of the present invention, the controller 1608 operates as follows to reconnect to the macro BS when an RLF takes place in the pico cell. The controller 1608 identifies that a context information storage instruction and a timer value are received from a macro BS at handover from a macro cell to a pico cell and stores, in the storage unit 1606, context information that has previously been used during an access to the macro BS. At this time, the controller 1608 marks which cell to which the stored context information corresponds. For example, the context information is indexed to a PCI of a cell of the macro BS and center frequency information or is indexed to a CGI of a macro cell. After that, if an RLF takes place in the pico cell, the controller 1608 preferentially performs a cell search process for the macro BS through the modem 1604, and as a result, if it discovers the macro BS, the controller 1608 determines whether the discovered macro BS is a BS corresponding to the stored context information using the information indexing the context information stored in the storage unit 1606. If it is possible to reuse the stored context information, the controller 1608 delivers a new security key to be used in the macro BS using a security key that has previously been used in the pico BS and the a PCI of the macro BS and center frequency information, and regenerates at least one radio bearer that has previously been used with the macro BS according to the context information stored in the storage unit 1606. At this time, if a radio bearer that is obsolete after handover to the pico cell exists, the controller 1608 regenerates only a radio bearer with the exception of the obsolete radio bearer. After generating a recovery request message, the controller 1608 transmits the recovery request message to the macro BS through the modem 1604 and the RF processor 1602. However, when a radio bearer newly added after handover to the pico cell exists, the controller 1608 temporarily stops a service provided through the added radio bearer, and after transmitting the recovery request message, the controller 1608 generates a radio bearer for the stopped service with the macro BS.

Figure 17:
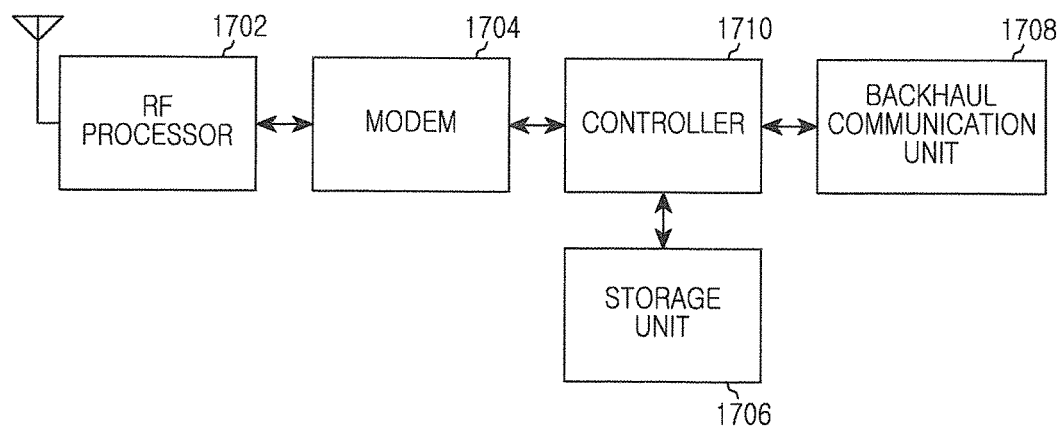
FIG. 17 is a block diagram of a BS in a heterogeneous wireless communication system according to an embodiment of the present invention.

FIG. 17 is a block diagram of a BS in a heterogeneous wireless communication system according to an embodiment of the present invention. The construction of FIG. 17 may be applicable to a pico BS or a macro BS.

As illustrated in FIG. 17, the BS includes an RF processor 1702, a modem 1704, a storage unit 1706, a backhaul communication unit 1708, and a controller 1710.

The RF processor 1702 performs a function for transmitting/receiving a signal through a wireless channel, such as signal band conversion, amplification and such. That is, the RF processor 1702 up converts a baseband signal provided from the modem 1704 into an RF band signal and transmits the RF band signal through an antenna, and down converts an RF band signal received through the antenna into a baseband signal.

The modem 1704 performs a function of conversion between a baseband signal and a bit stream according to a physical layer standard of a system. For example, during data transmission, the modem 1704 generates complex symbols by encoding and modulating a transmit bit stream, maps the complex symbols to subcarriers, and configures OFDM symbols through IFFT operation and CP insertion. Also, during data reception, the modem 1704 divides a baseband signal provided from the RF processor 1702 in an OFDM symbol unit, restores signals mapped to subcarriers through FFT operation, and restores a reception bit stream through demodulation and decoding. Also, the modem 1704 measures a channel quality using a receive signal, and detects a physical signal such as a synchronization signal and such.

The storage unit 1706 stores a program for operating the BS, setup information, temporary data and such. For example, the setup information includes system information of a BS, context information of the BS, authentication key information and so forth. The backhaul communication unit 1708 provides an interface for performing communication with other BS through a backhaul network.

The controller 1710 controls general functions of the BS. For example, the controller 1710 generates a data packet and provides the data packet to the modem 1704, and analyzes and processes a data packet provided from the modem 1704. Also, the controller 1710 interprets a control message received through the modem 1704, performs operation corresponding to the control message, processing and such, and generates a control message to be transmitted to an MS. Also, the controller 1710 determines a channel situation through channel quality information, a decoding success rate, a physical signal detection result, and such, which are provided from the modem 1704.

Particularly, the controller 1710 controls a function for supporting an MS to reconnect to a macro BS when the MS suffers an RLF in a pico cell. A function of the controller 1710 for supporting the MS to reconnect to the macro BS is described below.

When the BS is a pico BS according to the first type of embodiments of the present invention, the controller 1710 operates as follows. If an MS performs handover from a macro cell to the pico BS, the controller 1710 transmits a request for releasing context information of the MS to the macro BS and then transmits the full context information of the MS to the macro BS. However, the transmission of the full context information is an operation that follows the request for releasing the context information, and if the release request is not performed, the operation of transmitting the full context information may be omitted. After that, if the context information of the MS is changed, the controller 1710 transmits the changed context information to the macro BS.

When the BS is a macro BS according to the first type of embodiments of the present invention, the controller 1710 operates as follows. After an MS does handover to a pico BS, if context information of the MS is received from the pico BS, the controller 1710 stores the context information in the storage unit 1706. An operation of receiving and storing the context information is carried out on the premise that the context information of the MS has been discarded after the handover of the MS. Thus, if the previous context information is not discarded, an operation of receiving and storing the context information may be omitted. After that, if the changed context information of the MS is received, the controller 1710 updates context information stored in the storage unit 1706 by using the changed context information. Also, if an RRC connection re-establishment request is received from the MS, the controller 1710 determines whether the MS transmitting the RRC connection re-establishment request is an MS corresponding to the stored context information using sender's identification information included in the RRC connection re-establishment request message. If the MS transmitting the RRC connection re-establishment request is the MS corresponding to the stored context information, the controller 1710 performs an RRC connection re-establishment process according to the request of the MS. At this time, because the context information of the MS has been stored in the storage unit 1706, the RRC connection re-establishment procedure can be performed successfully.

When the BS is a macro BS according to the second type of embodiments of the present invention, the controller 1710 operates as follows. The controller 1710 transmits an instruction for storing system information of the macro BS to an MS doing handover to a pica cell. After that, if the system information of the macro BS is changed, the controller 1710 transmits a system information update message including the changed system information to the pico BS through the backhaul communication unit 1708. Accordingly, the changed system information is forwarded to the MS via the pico BS. Also, if an RRC connection re-establishment request is received from the MS, the controller 1710 performs an RRC connection re-establishment procedure. At this time, if the context information of the MS has not been stored in the storage unit 1706, the RRC connection re-establishment procedure can fail.

When the BS is a macro BS according to the third type of embodiments of the present invention, the controller 1710 operates as follows. The controller 1710 transmits to the MS an instruction for storing context information of an MS doing handover to a pico cell, and forwards a timer value to the MS. And, the controller 1710 stores the context information of the MS, delivers a security key to be provided to a pico BS, and stores the security key in the storage unit 1706. After that, if a recovery request message is received from the MS before the timer expires, the controller 1710 determines whether it is possible to reuse the context information stored in the storage unit 1706. If it is possible to reuse the stored context information, the controller 1710 delivers a new security key for the MS. That is, the controller 1710 delivers a new security key using a security key that has previously been used by the MS in the pico BS and its own PCI and center frequency information. After that, the controller 1710 recovers at least one radio bearer with the MS according to context information stored in the storage unit 1706, and notifies the MS of connection return completion. At this time, when obsolete radio bearer information is included in the recovery request message, the controller 1710 recovers only a radio bearer with the exception of the obsolete radio bearer. After recovering the at least one radio bearer, the controller 1710 transmits a request for context information of an MS to the pico BS through the backhaul communication unit 1708, and acquires the context information from the pico BS. Next, if information on service added to the latest context information acquired from the pico BS exists, the controller 1710 generates a radio bearer for the added service.

As described above, an MS can minimize a service interruption time by reconnecting to a macro cell quickly when the MS suffers an RLF after handover to a pico cell in a heterogeneous wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for an operation of a terminal in a wireless communication system, the method comprising:
storing first system information of a first base station upon initiating a handover from the first base station to a second base station;
in response to a change of system information of the first base station from the first system information to second system information after the handover from the first base station to the second base station is completed, receiving, from the first base station via the second base station, the second system information of the first base station before the terminal performs a re-establishment procedure with the first base station; and
then when a radio link failure occurs in the second base station, searching for the first base station and performing the re-establishment procedure with the first base station based on the second system information,
wherein the second system information is different from the first system information.

2. The method of claim 1, wherein performing the re-establishment procedure comprises performing a random access procedure to the first base station based on random access related parameters comprised in the first system information.

3. A method for an operation of a second base station in a wireless communication system, the method comprising:
in response to a change of system information of a first base station from first system information to second system information after a handover of a terminal from the first base station to the second base station is completed, transmitting, to the terminal, the second system information of the first base station before the terminal performs a re-establishment procedure with the first base station,
wherein the second system information of the first base station is transmitted from the first base station via the second base station,
wherein, then when a radio link failure occurs in the second base station, the re-establishment procedure between the terminal and the first base station is performed based on the second system information after the first base station is searched,
wherein the first system information of the first base station is stored after the handover of the terminal from the first base station to a second base station is initiated, and
wherein the second system information is different from the first system information.

4. The method of claim 3, further comprising:
transmitting a request for a path switch request for the terminal to an upper node;
transmitting to the first base station a request for releasing previously stored context information of the terminal; and
transmitting full context information of the terminal to the first base station.

5. The method of claim 3, wherein at least one of first context information and second context information comprises at least one of a measurement configuration that the terminal uses in a source cell, radio bearer (RB) configuration information, media access control (MAC) layer configuration information, physical layer related information, radio network temporary identifier (C-RNTI), and security related information.

6. The method of claim 3, further comprising:
receiving a request for data forwarding for the terminal from the first base station; and
forwarding sequence number (SN) state information of the terminal and data intended for the terminal to the first base station.

7. A method for an operation of a first base station in a wireless communication system, the method comprising:
in response to a change of system information of the first base station from first system information to second system information after a handover of a terminal from the first base station to a second base station is completed, transmitting, to the terminal via the second base station, the second system information of the first base station before the terminal performs a re-establishment procedure with the first base station; and
then when a radio link failure occurs in the second base station, performing the re-establishment procedure with the terminal based on the second system information after the first base station is searched, wherein the first system information of the first base station is stored after the handover of the terminal from the first base station to a second base station is initiated, and
wherein the second system information is different from the first system information.

8. The method of claim 7, further comprising:
after the terminal performs handover from the first base station to the second base station, receiving a request for releasing previously stored context information of the terminal from the second base station;
discarding the previously stored context information of the terminal;
receiving a full context information of the terminal from the second base station; and
storing the full context information of the terminal.

9. The method of claim 7, wherein at least one of first context information and second context information comprises at least one of a measurement configuration that the terminal uses in a source cell, radio bearer (RB) configuration information, media access control (MAC) layer configuration information, physical layer related information, radio network temporary identifier (C-RNTI), and security related information.

10. The method of claim 7, wherein performing the re-establishment procedure comprises:
receiving a radio resource control (RRC) re-establishment request message from the terminal;
determining that first context information of the terminal has been stored;
performing a message authentication code-integrity (MAC-I) authentication procedure for the terminal;
sending an RRC re-establishment response message to the terminal; and sending a request to the second base station to forward data intended for the terminal.

11. The method of claim 7, further comprising:
after the terminal performs handover from the first base station to the second base station, if system information is changed, sending a system information update message for the changed system information to the terminal through the second base station.

12. The method of claim 7, further comprising:
transmitting a message comprising a handover command and a request to store system information to the terminal.

13. An apparatus for a terminal in a wireless communication system, the apparatus comprising:
at least one transceiver; and
at least one processor coupled to the at least one transceiver,
wherein the at least one processor is configured to:
store first system information of a first base station upon initiating a handover from the first base station to a second base station,
in response to a change of system information of the first base station from the first system information to second system information after the handover from the first base station to the second base station is completed, control to receive, from the first base station via the second base station, the second system information of the first base station before the terminal performs a re-establishment procedure with the first base station, and
then when a radio link failure occurs in the second base station, search for the first base station and perform the re-establishment procedure with the first base station based on the second system information,
wherein the second system information is different from the first system information.

14. The apparatus of claim 13, wherein the at least one processor is further configured to perform a random access procedure to the first base station based on random access related parameters comprised in the first system information.

15. An apparatus for a second base station in a wireless communication system, the apparatus comprising:
at least one transceiver; and
at least one processor coupled to the at least one transceiver,
wherein the at least one processor is configured to:
in response to a change of system information of a first base station from first system information to second system information after a handover of a terminal from the first base station to the second base station is completed, transmit, to the terminal, the second system information of the first base station before the terminal performs a re-establishment procedure with the first base station,
wherein the second system information of the first base station is transmitted from the first base station via the second base station,
wherein, then when a radio link failure occurs in the second base station, the re-establishment procedure between the terminal and the first base station is performed based on the second system information after the first base station is searched,
wherein the first system information of the first base station is stored after the handover of the terminal from the first base station to a second base station is initiated, and
wherein the second system information is different from the first system information.

16. The apparatus of claim 15, wherein the at least one processor is further configured to:
transmit a request for a path switch for the terminal to an upper node,
transmit to the first base station a request for releasing previously stored context information of the terminal after transmitting the path switch request, and
transmit full context information of the terminal to the first base station.

17. The apparatus of claim 15, wherein at least one of first context information and second context information comprises at least one of a measurement configuration that the terminal uses in a source cell, radio bearer (RB) configuration information, media access control (MAC) layer configuration information, physical layer related information, radio network temporary identifier (C-RNTI), and security related information.

18. The apparatus of claim 15, wherein the at least one processor is further configured to:
receive a request for data forwarding for the terminal from the first base station, and
forward sequence number (SN) state information of the terminal and data intended for the terminal to the first base station after connection with the terminal fails without handover.

19. An apparatus for a first base station in a wireless communication system, the apparatus comprising:
at least one transceiver; and
at least one processor coupled to the at least one transceiver,
wherein the at least one processor is configured to:
in response to a change of system information of the first base station from first system information to second system information after a handover of a terminal from the first base station to a second base station is completed, transmit, to the terminal via the second base station, the second system information of the first base station before the terminal performs a re-establishment procedure with the first base station, and
then when a radio link failure occurs in the second base station, perform the re-establishment procedure with the terminal based on the second system information after the first base station is searched,
wherein the first system information of the first base station is stored after the handover of the terminal from the first base station to a second base station is initiated, and
wherein the second system information is different from the first system information.

20. The apparatus of claim 19, wherein the at least one processor is further configured to:
receive a request for releasing previously stored context information of the terminal from the second base station,
discard the previously stored context information of the terminal,
receive a full context information of the terminal from the second base station, and
store the full context information of the terminal.

21. The apparatus of claim 19, wherein at least one of first context information and second context information comprises at least one of a measurement configuration that the terminal uses in a source cell, radio bearer (RB) configuration information, media access control (MAC) layer configuration information, physical layer related information, radio network temporary identifier (C-RNTI), and security related information.

22. The apparatus of claim 19, wherein the at least one processor is further configured to:
receive a radio resource control (RRC) re-establishment request message from the terminal,
determine that first context information of the terminal has been stored,
perform a message authentication code-integrity (MAC-I) authentication procedure for the terminal,
transmit an RRC re-establishment response message to the terminal, and transmit a request to the second base station to forward data intended for the terminal.

23. The apparatus of claim 19, wherein the at least one processor is further configured to:
if system information is changed after the terminal performs handover from the first base station to the second base station, transmit a system information update message for the changed system information to the terminal through the second base station.

24. The apparatus of claim 19, wherein the at least one processor is further configured to transmit a message comprising a handover command and a request to store system information to the terminal.

* * * * *